United States Patent
Jiang et al.

(10) Patent No.: US 12,510,721 B2
(45) Date of Patent: Dec. 30, 2025

(54) IMAGING OPTICAL DEVICE AND MANUFACTURING METHOD THEREFOR

(71) Applicant: NINGBO SUNNY OPOTECH CO., LTD., Ningbo Zhejiang (CN)

(72) Inventors: Heng Jiang, Zhejiang (CN); Shuijia Chu, Zhejiang (CN); Lin Liu, Zhejiang (CN); Chengchang Zheng, Zhejiang (CN)

(73) Assignee: NINGBO SUNNY OPOTECH CO., LTD, Zhejiang (CN)

( * ) Notice: Subject to any disclaimer, the term of this patent is extended or adjusted under 35 U.S.C. 154(b) by 1090 days.

(21) Appl. No.: 16/980,915

(22) PCT Filed: Mar. 18, 2019

(86) PCT No.: PCT/CN2019/078477
§ 371 (c)(1),
(2) Date: Sep. 15, 2020

(87) PCT Pub. No.: WO2019/174644
PCT Pub. Date: Sep. 19, 2019

(65) Prior Publication Data
US 2020/0409016 A1     Dec. 31, 2020

(30) Foreign Application Priority Data

Mar. 16, 2018  (CN) .......................... 201810219941.2
Mar. 16, 2018  (CN) .......................... 201810220345.6
(Continued)

(51) Int. Cl.
*G02B 7/00*    (2021.01)
*G02B 7/02*    (2021.01)

(52) U.S. Cl.
CPC ............. *G02B 7/003* (2013.01); *G02B 7/021* (2013.01); *G02B 7/025* (2013.01)

(58) Field of Classification Search
CPC ........ G02B 7/003; G02B 7/021; G02B 7/025; G02B 7/023
See application file for complete search history.

(56) References Cited

U.S. PATENT DOCUMENTS

2009/0190241 A1   7/2009  Yen
2009/0244735 A1   10/2009 Sasaki
(Continued)

FOREIGN PATENT DOCUMENTS

CN   101493569   7/2009
CN   201281776   7/2009
(Continued)

OTHER PUBLICATIONS

International Search Report issued Jun. 17, 2019 in International (PCT) Application No. PCT/CN2019/078477.
(Continued)

*Primary Examiner* — Collin X Beatty
(74) *Attorney, Agent, or Firm* — Wenderoth, Lind & Ponack, L.L.P.

(57) ABSTRACT

A manufacturing method of an imageable optical device includes pre-positioning at least two lens components along the optical axis so that the at least two lens components are able to form an image. A first structural gap and a second structural gap are arranged at different positions between two adjacent lens components. The method also includes adjusting relative positions of the pre-positioned at least two lens components by active alignment, arranging a first adhesive in the first structural gap, arranging a second adhesive in the second structural gap, and sequentially curing the first and second adhesives. The influence of later steps of the manufacturing process on the imageable optical device may thus be reduced, and connection strength and reliability of the imageable optical device are improved by subsequently curing the second adhesive. Also provided are
(Continued)

an optical lens having an air escape channel, and an assembly method thereof.

20 Claims, 12 Drawing Sheets

(30) Foreign Application Priority Data

Mar. 16, 2018 (CN) .......................... 201820362456.6
Mar. 16, 2018 (CN) .......................... 201820366562.1

(56) References Cited

U.S. PATENT DOCUMENTS

| | | | |
|---|---|---|---|
| 2017/0041515 A1 | 2/2017 | Ohara | |
| 2017/0160509 A1* | 6/2017 | Wang | ................... H04N 17/002 |
| 2017/0261717 A1 | 9/2017 | Hsu | |
| 2018/0188472 A1* | 7/2018 | Deng | ..................... G02B 7/025 |

FOREIGN PATENT DOCUMENTS

| | | | | |
|---|---|---|---|---|
| CN | 203745707 | | 7/2014 | |
| CN | 105445889 A | * | 3/2016 | ......... G02B 13/0045 |
| CN | 206411325 | | 8/2017 | |
| CN | 107643588 | | 1/2018 | |
| CN | 207067513 | | 3/2018 | |
| CN | 208141014 | | 11/2018 | |
| CN | 208239703 | | 12/2018 | |
| KR | 10-2014-0076761 | | 6/2014 | |
| TW | 201224558 | | 6/2012 | |

OTHER PUBLICATIONS

The Extended European Search Report issued Jun. 18, 2021 in corresponding European Patent Application No. 19766981.5.
Communication pursuant to Article 94(3) EPC issued Jul. 4, 2022 in corresponding European Patent Application No. 19 766 981.5.
First Office Action issued Jul. 29, 2023 in corresponding Chinese Patent Application No. 201810220345.6, with English translation.

* cited by examiner

IMAGING OPTICAL DEVICE AND MANUFACTURING METHOD THEREFOR

CROSS REFERENCE

This application claims priorities of invention patent application No. 201810219941.2 filed with the Chinese Patent Office on Mar. 16, 2018, titled "Imageable Optical Device and Manufacturing Method Thereof"; utility model patent application No. 201820362456.6 filed with the Chinese Patent Office on Mar. 16, 2018, titled "imaginable optical device"; and invention patent application No. 201810220345.6 filed with the Chinese Patent Office on Mar. 16, 2018, titled "Optical Lens with Air Escape Channel and Assembly Method Thereof"; and utility model patent application No. 201820366562.1 filed with the Chinese Patent Office on Mar. 16, 2018, titled "Optical Lens and Camera Module"; the entire content of the above patent applications is incorporated herein by reference.

TECHNICAL FIELD

This application relates to field of optical lens, and particularly, to an imageable optical device and manufacturing method thereof, solutions for optical lens and camera module, and more particularly to optical lens with an air escape channel.

BACKGROUND TECHNIQUE

With the popularization of mobile electronic devices, related technologies of imageable optical devices used in mobile electronic devices to help users to acquire images (e.g., videos or images) have been rapidly developed and advanced. In recent years, imageable optical devices have been widely used in many fields such as medical treatment, security, industrial production and so on.

In order to meet more and more extensive market demands, high pixels, small size, and large aperture are irreversible development trends of existing imageable optical devices. The market has put forward higher and higher demands for the image quality of imageable optical devices. Factors affecting resolution of the imageable optical devices of a given optical design include quality of the optical imaging lens and manufacturing errors in the process of module encapsulation.

Particularly, in the manufacturing process of the optical imaging lens, factors affecting the resolution of the lens come from: the errors of each element and its assembly, the error of the thickness of the lens spacer element, the error of the assembly of each lens, and the change of the refractive index of lens material, etc. Among them, the errors of each element and its assembly include: the errors of the thickness of the optical surface of each lens unit, the rise of the optical surface of the lens, the shape of the optical surface, the radius of curvature, the eccentricity of the single side and the eccentricity between the surfaces of the lens, and the inclination of the optical surface of the lens. The magnitude of the error depends on the mold accuracy and the control ability for molding accuracy. The thickness error of the lens spacer element depends on the processing accuracy of the element. The error of the assembly of each lens depends on the dimensional tolerance of the assembled components and the assembly accuracy of the lens. The error introduced by the change of the refractive index of the lens material depends on the stability of the material and batch consistency.

The errors of the above-mentioned components affecting the resolution produce a cumulative deterioration, and this cumulative error will continue to increase as the number of lens increases. The existing resolution solution is to control the tolerance of the size of the relatively sensitive components and compensate for the rotation of the lens to improve the resolution. However, since the lens with high pixels and large aperture is more sensitive, it requires strict tolerances, for example, 1 μm of lens eccentricity for some sensitive lens will cause 9' inclination of the image plane, thereby making lens processing and assembly more and more difficult. At the same time, due to the long feedback cycle in the assembly process, the process capability index (CPK) of lens assembly is low and fluctuates greatly, resulting in high defective rate. And as mentioned above, since there are many factors affecting the resolution of the lens, and they exist in multiple components, the control of each factor has the limit of manufacturing accuracy. If only the accuracy of each component is improved, the improvement ability is limited, and the improvement cost is high; and it still cannot meet the increasing demand of the market for image quality.

On the other hand, during the processing of imageable optical devices, the assembly process of various structural components (e.g., the mounting of photosensitive chip, the process of locking and attaching the motor and the lens, etc.) may cause inclination of the photosensitive chip; the superposition of multiple inclinations may cause the resolution of the imaging module to fail to meet the established specifications, and thereby cause the low yield of the module factory. In recent years, the module factory has compensated for the inclination of the photosensitive chip through an active alignment process, when assembling the imaging lens and the photosensitive module. However, this process has limited compensation capability, since various aberrations affecting the resolution come from the capability of the optical system itself, when the resolution of the optical imaging lens itself is insufficient, the existing active alignment process of the photosensitive module is difficult to compensate.

On the other hand, the lens is an important component of the camera module, which directly affects the imaging quality of the camera module. In a multi-group lens, the lens components are connected by adhesive, so it is often necessary to bake the lens module to solidify the adhesive to achieve the connection. The differences between the process flow of the upper and lower lens components and the process flow of the integrally formed lens components lie in that: when the upper and lower lens components are assembled, an open space reserved for the installation and adjustment of the upper and lower lens components is required. This open space needs to be sealed in the subsequent process. Generally, heat curing adhesive is used for complete fixation. Since air between the upper and lower lens components will cause gas expansion during baking, the gas expansion will influence the upper and lower lens components, thereby changing the relative positions of the optical elements of the lens components, resulting in a decrease in optical capability. In addition, due to the curing of the adhesive, the open space will be fixed accordingly, and a certain structural strength of the upper and lower lens components is required to ensure that the fixed open space will not change. However, the air between the upper and lower lens components will expand when the lens module is baked, and the air shrink after the baking is completed, thereby resulting in a greater influence on the reliability of the lens module.

Therefore, how to avoid the influence of air on the camera module during the baking process is a problem to be solved in this field.

CONTENTS OF THE INVENTION

An object of this application is to provide a solution that may overcome at least one of the above-mentioned drawbacks of the prior art.

An aspect of the present application provides a method for manufacturing an imageable optical device, wherein the method includes: pre-positioning at least two lens components along an optical axis to make the at least two lens components to be able to form an image, wherein a first structural gap and a second structural gap are arranged at different positions between two adjacent lens components; adjusting relative positions of the pre-positioned at least two lens components by means of active alignment; arranging a first adhesive in the first structural gap (for example, arranging a first adhesive may be dispensing adhesive with the first adhesive), and arranging a second adhesive in the second structural gap (for example, arranging a second adhesive may be dispensing adhesive with the second adhesive); and sequentially curing the first adhesive and the second adhesive.

According to an embodiment of the present application, preparing the at least two lens components to be separated from each other and each comprising at least one lens include: equipping at least one of the at least two lens components with a lens barrel.

According to an embodiment of the present application, each of the lens components includes at least one lens, and the method further includes: shaping the lens barrel to wrap at least a part of an upper surface and a lower surface of the lens.

According to an embodiment of the present application, before pre-positioning at least two lens components along the optical axis, the method further include: shaping surfaces of two adjacent lens components of the at least two lens components corresponding to the first structural gap to extend away from a direction of the optical axis and to face an outer openings of the at least two lens components.

According to an embodiment of the present application, before pre-positioning at least two lens components along the optical axis, the method further include: shaping surfaces of the two adjacent lens components corresponding to the first structural gap to fit each other; and shaping surfaces of the two adjacent lens components corresponding to the second structural gap to fit each other.

According to an embodiment of the present application, before pre-positioning at least two lens components along the optical axis, the method further include: shaping surfaces of the two adjacent lens components corresponding to the first structural gap and the second structural gap to be perpendicular to the optical axis.

According to an embodiment of the present application, before pre-positioning at least two lens components along the optical axis, the method further include: shaping surfaces of any one of the two adjacent lens components corresponding to the first structural gap and the second structural gap to be on a same horizontal plane.

According to an embodiment of the present application, before pre-positioning at least two lens components along the optical axis, the method further include: shaping surfaces of the two adjacent lens components corresponding to the first structural gap to be perpendicular to the optical axis, and shaping surfaces of the two adjacent lens components corresponding to the second structural gap to have an inclination segment inclined with respect to the optical axis.

According to an embodiment of the present application, before pre-positioning at least two lens components along the optical axis, the method further include: forming a connecting protrusion part on one of the two adjacent lens components; and forming a connecting recess part that substantially fits and receives the connecting protrusion part on the other of the two adjacent lens components.

According to an embodiment of the present application, forming the connecting protrusion part include: forming the connecting protrusion part to have at least one shape of a trapezoidal, triangular, rectangular, semi-circular, and double-triangular shape in a cross section parallel to the optical axis.

According to an embodiment of the present application, forming the connecting protrusion part include forming the connecting protrusion part to have a continuous shape in a cross section perpendicular to the optical axis.

According to an embodiment of the present application, forming the connecting protrusion part include forming the connecting protrusion part to have a discrete shape in a cross section perpendicular to the optical axis.

According to an embodiment of the present application, forming the connecting protrusion part include forming the connecting protrusion part at equal intervals around the optical axis.

According to the embodiment of the present application, pre-positioning the at least two lens components along the optical axis include: bringing the at least two lens components close to each other along the optical axis, to make the first structural gap and the second structural gap to have same width.

According to the embodiment of the present application, pre-positioning the at least two lens components along the optical axis include: bringing the at least two lens components close to each other along the optical axis, to make the first structural gap and the second structural gap to have a width range of 30-300 µm, preferably 30-100 µm.

According to an embodiment of the present application, the first adhesive is a light curing adhesive or a photothermal curing adhesive. In this case, the first structural gap has a light-receiving opening.

According to an embodiment of the present application, the second adhesive is a heat curing adhesive.

According to an embodiment of the present application, the second adhesive is a photo-thermal curing adhesive. In this case, the second structural gap has an opening arranged to have an inclination angle.

According to an embodiment of the present application, curing the first adhesive include irradiating the first adhesive with a light sensitive to the light curing adhesive or the photothermal curing adhesive.

According to an embodiment of the present application, curing the second adhesive include heating the second adhesive.

Another aspect of the present application provides an imageable optical device, wherein the imageable optical device includes: at least two lens components, wherein the at least two lens components are positioned sequentially along an optical axis direction, and a first structural gap and a second structural gap are arranged at different positions between the two adjacent lens components; a first adhesive, the first adhesive being arranged in the first structural gap; and a second adhesive, the second adhesive being arranged in the second structural gap, wherein the arrangement positions and material of the first adhesive and the second adhesive are adapted to enable the first adhesive and the second adhesive to be cured successively at different times.

According to an embodiment of the present application, at least one of the at least two lens components includes a lens barrel.

According to an embodiment of the present application, the lens barrel wraps at least a part of an upper surface and a lower surface of the lens. In this case, the first structural gap or the second structural gap have an overlap area with the at least part of the lens surface wrapped by the lens barrel along a direction of the optical axis.

According to an embodiment of the present application, surfaces of two adjacent lens components corresponding to the first structural gap extend away from the direction of the optical axis and face an outer openings of the at least two lens components.

According to the embodiment of the present application, surfaces of two adjacent lens components corresponding to the first structural gap fit with each other. Surfaces of two adjacent lens components corresponding to the second structural gap fit with each other.

According to the embodiment of the present application, surfaces of the two adjacent lens components corresponding to the first structural gap and the second structural gap are perpendicular to the optical axis.

According to the embodiment of the present application, surfaces of any one of the two adjacent lens components corresponding to the first structural gap and the second structural gap are on a same horizontal plane.

According to an embodiment of the present application, surfaces of the two adjacent lens components corresponding to the first structural gap are perpendicular to the optical axis. Surfaces of the two adjacent lens components corresponding to the second structural gap have an inclination segment inclined with respect to the optical axis.

According to an embodiment of the present application, one of the two adjacent lens components include a connecting protrusion part that protrudes toward the other lens component. The other of the two adjacent lens components include a connecting recess part that fits and receives the connecting protrusion part.

According to an embodiment of the present application, the connecting protrusion part has at least one shape of a trapezoidal, triangular, rectangular, semi-circular, and double-triangular shape in a cross section parallel to the optical axis.

According to an embodiment of the present application, the connecting protrusion part has a continuous shape in a cross section perpendicular to the optical axis.

According to an embodiment of the present application, the connecting protrusion part has a discrete shape in a cross section perpendicular to the optical axis.

According to an embodiment of the present application, the connecting protrusions part is arranged at equal intervals around the optical axis.

According to an embodiment of the present application, the first structural gap and the second structural gap have substantially same width.

According to the embodiment of the present application, the first structure gap and the second structure gap have a width range of 30-300 µm, preferably 30-100 µm.

According to an embodiment of the present application, the first adhesive is a light curing adhesive or a photothermal curing adhesive. In this case, the first structural gap has a light-receiving opening.

According to an embodiment of the present application, the second adhesive is a heat curing adhesive.

According to an embodiment of the present application, the second adhesive is a photothermal curing adhesive. In this case, the second structural gap has an opening arranged to have an inclination angle.

Another aspect of the present application provides an optical lens with an air escape channel.

In an embodiment of this aspect, the optical lens includes: a first sub-lens, including at least one first lens and a first lens barrel that accommodates the first lens, or consisting of a single first lens; a second sub-lens, including at least one second lens and a second lens barrel that accommodates the second lens; and an adhesive, bonding the first sub-lens and the second sub-lens together, wherein the adhesive, the first sub-lens and the second sub-lens jointly form a cavity, wherein a part of at least one of the first lens, the first lens barrel, the second lens, the second lens barrel, and the adhesive forms an air escape channel, and wherein one end of the air escape channel leads to the cavity, and the other end of the air escape channel leads to the outside.

According to an embodiment of the present application, one end of the air escape channel leading to the cavity has an opening being enlarged relative to a size of the air escape channel.

According to an embodiment of the present application, one end of the air escape channel leading to the outside has another opening being enlarged relative to the air escape channel. In some alternative embodiments, the other opening has an inclined inner surface.

According to an embodiment of the present application, the air escape channel is an air escape hole arranged in at least one of the first lens, the first lens barrel, the second lens, and the second lens barrel.

According to the embodiment of the present application, the air escape channel is an air escape hole arranged in the first lens barrel in a direction parallel to the optical axis of the optical system consisting of the first lens and the second lens, or arranged in the first lens barrel at an angle relative to the direction.

According to an embodiment of the present application, the air escape channel is an air escape hole arranged in the first lens barrel and/or the second lens barrel in a direction perpendicular to the optical axis of the optical system consisting of the first lens and the second lens, or arranged in the first lens barrel and/or the second lens barrel at an angle relative to the direction.

According to an embodiment of the present application, the first lens includes an effective area for transmitting light and an ineffective area located on periphery of the effective area, and the air escape channel is an air escape hole arranged in the ineffective area of the first lens in a direction parallel to the optical axis of the optical system consisting of the first lens and the second lens, or arranged in the ineffective area of the first lens at an angle relative to the direction.

According to an embodiment of the present application, the air escape channel is a groove arranged at a surface of the first lens barrel facing the second lens barrel, and/or arranged at a surface of the second lens barrel facing the first lens barrel.

According to an embodiment of the present application, the air escape channel is an air escape groove arranged on the first lens barrel and/or the first lens along a contact boundary between the first lens barrel and the first lens.

According to the embodiment of the present application, the adhesive is in a form of a C-shaped ring in a plane view, so that the air escape channel is formed by the gap of the C-shaped ring.

According to the embodiment of the present application, the adhesive is in a form of a plurality of C-shaped rings spaced apart from each other in a radial direction in a plane view.

According to an embodiment of the present application, the optical lens further include a sealing material for sealing the gaps of the C-shaped rings in the outermost layer.

According to the embodiment of the present application, the gaps of the plurality of C-shaped rings are spaced as far as possible in the circumferential direction.

According to an embodiment of the present application, the air escape channel further includes an air escape groove communicating with the gap of the C-shaped ring, and the air escape groove is arranged on the first lens barrel and/or the second lens barrel along a contact part between the first sub-lens and the second sub-lens.

According to an embodiment of the present application, the optical lens further include a sealing material for sealing an end of the air escape channel leading to the outside.

According to an embodiment of the present application, the air escape channel is in at least one form of a straight line, a broken line, and a curve form in a plane view.

Another aspect of the present application provides a camera module including the optical lens according to the first aspect.

Another aspect of the present application provides an assembly method of optical lens.

In an embodiment of this aspect, the assembly method includes: accommodating and installing at least one first lens in a first lens barrel to form a first sub-lens; accommodating and installing at least one second lens in a second lens barrel to form a second sub-lens; and bonding the first sub-lens and the second sub-lens together by using adhesive, wherein the adhesive, the first sub-lens and the second sub-lens jointly form a cavity, and wherein the assembly method further includes: in the process of bonding the first sub-lens and the second sub-lens, an air escape channel is formed by a through-hole and/or a gap arranged in at least one of the first lens, the first lens barrel, the second lens, the second lens barrel, and the adhesive, so that the air in the cavity is in communication with the outside, and wherein one end of the air escape channel leads to the cavity, and the other end of the air escape channel leads to the outside.

According to an embodiment of the present application, the assembly method further includes: sealing an end of the air escape channel leading to the outside, after the assembly of the optical lens is completed.

According to the embodiment of the present application, bonding the first sub-lens and the second sub-lens together by using adhesive includes: dispensing the adhesive on the first lens barrel and the second lens barrel, so that the adhesive is in a form of a C-shaped ring in a plane view, and thereby the air escape channel is formed by the gap of the C-shaped ring.

According to an embodiment of the present application, dispensing the adhesive includes: dispensing the adhesive multiple times, so that the adhesive is in a form of a plurality of C-shaped rings spaced apart from each other in a radial direction in a plane view.

According to the embodiment of the present application, the assembly method further includes: sealing the gaps of the C-shaped rings in the outermost layer, after the assembly of the optical lens is completed.

The fourth aspect of the present application provides an assembly method of optical lens.

In an embodiment of the fourth aspect, the optical lens includes a first lens and at least one second lens, and the assembly method includes:

accommodating and installing the at least one second lens in a second lens barrel to form a second sub-lens; and bonding the first lens and the second sub-lens together by using adhesive, wherein the adhesive and the second sub-lens jointly form a cavity, and wherein the assembly method further includes: in the process of bonding the first sub-lens and the second sub-lens, an air escape channel is formed by a through-hole and/or a gap arranged in at least one of the first lens, the second lens, the second lens barrel, and the adhesive, so that the air in the cavity is in communication with the outside, and wherein one end of the air escape channel leads to the cavity, and the other end of the air escape channel leads to the outside.

According to the technical solution provided by the present application, the imageable optical device is assembled by a plurality of lens components separated from each other, and the adjustment amount can be provided by using the first adhesive and the second adhesive for adjusting the relative positions of two adjacent lens components. Since the first adhesive and the second adhesive can be cured sequentially, on one hand, the imageable optical device may be pre-fixed by the firstly cured first adhesive to reduce the influence of the subsequent manufacturing process on the imageable optical device; and on the other hand, a connection strength and reliability of the imageable optical devices can be increased by the subsequently cured second adhesive.

In addition, compared with the prior art, the technical solution of the present application at least achieves the following beneficial effects: by adding an air escape channel design (for example, air escape holes, grooves, air escape grooves, etc.) to the lens module, the baking variation of the lens module is reduced, thereby avoiding adverse effects on the reliability of the module due to the heat-expansion or cold-contraction of the air during the baking process.

BRIEF DESCRIPTION OF THE DRAWINGS

By reading the detailed description of the non-limiting embodiments with reference to the following drawings, other features, purposes and advantages of the present application will become more apparent.

DETAILED DESCRIPTION OF THE EMBODIMENTS

Figure 1:
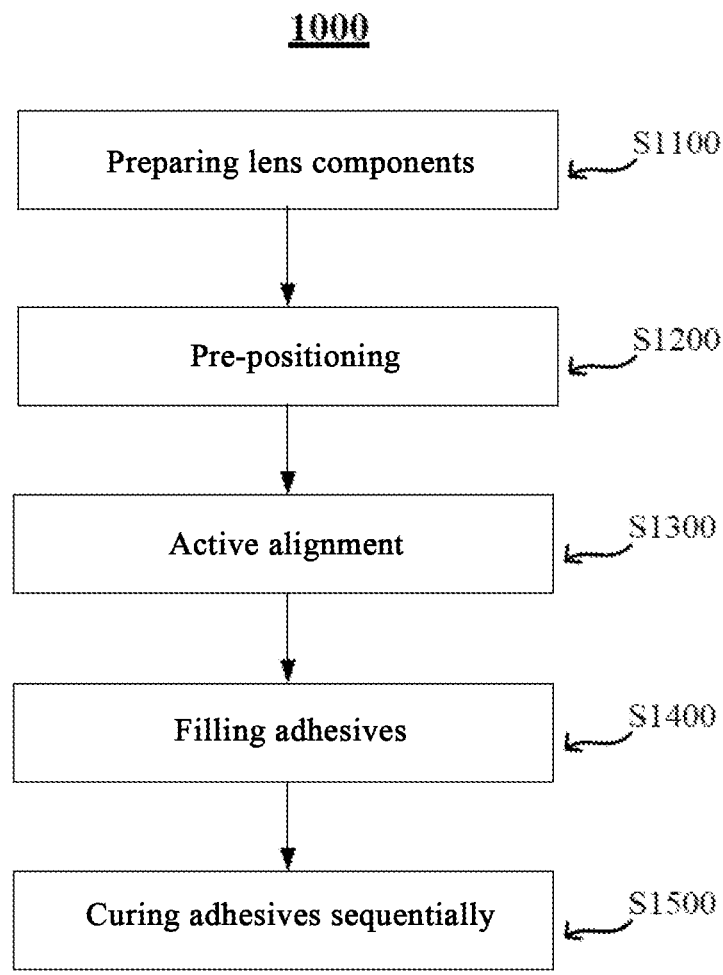
FIG. 1 is a flowchart of a method for manufacturing an imageable optical device according to an embodiment of the present application.

In order to better understand the application, various aspects of the application will be described in more detail with reference to the drawings. It should be understood that these detailed descriptions are only descriptions of exemplary embodiments of the present application, and are not intended to limit the scope of the present application in any way. Throughout the specification, the same reference numerals refer to the same elements. The expression "and/or" includes any and all combinations of one or more of the listed items which are related to each other.

It should be noted that in this specification, expressions such as first, second, third, etc. are only used to distinguish one feature from another feature, and do not represent any restriction on the feature. Therefore, without departing from the teachings of the present application, the first lens component discussed below may also be referred to as the second lens component.

In the drawings, for ease of description, the thickness, size, and shape of each component may have been slightly exaggerated. Particularly, the shape of the spherical or aspheric surface in the drawings is shown by way of example. That is, the shape of the spherical or the aspheric surface is not limited to the shape of the spherical surface or aspheric surface shown in the drawings. The drawings are only examples and are not drawn strictly to scale.

It should also be understood that, when the terms "include/including", "having", "comprise" and/or "comprising" are used in this specification, they mean that the stated features, elements and/or components are present, but does not exclude the presence or addition of one or more other features, elements, components and/or their combinations. In addition, when the expression such as "at least one of . . . " appears before the listed features, it modifies the entire listed features instead of modifying the individual elements in the list. In addition, when describing the embodiments of the present application, "may" is used to mean "one or more embodiments of the present application"; and the term "exemplary" is intended to refer to an example or giving an illustration.

As used herein, the terms "approximately", "about", and similar terms are used as approximate terms, not as terms representing degree, and they are intended to describe the inherent deviation in the measured value or the calculated value that will be recognized by those of ordinary skill in the art.

Unless otherwise defined, all terms (including technical terms and scientific terms) used herein have the same meanings as commonly understood by those of ordinary skill in the art to which this application belongs. It should also be understood that terms (e.g., terms defined in commonly used dictionaries) should be interpreted as having meanings consistent with their meanings in the context of related technologies, and will not be interpreted in an idealized or excessively formal sense unless it is clearly defined herein.

It should be noted that the embodiments in this application and the features in the embodiments may be combined with each other if there is no conflict. In addition, unless clearly defined or contradictory to the context, the specific steps included in the method described in this application are not necessarily limited to the described order, and may be executed in any order or in parallel. For example, the active alignment step described in this application may be executed interchangeably with the adhesive dispensing step without affecting the implementation of the technical solution of this application. Hereinafter, the present application will be described in detail with reference to the drawings and in conjunction with embodiments.

Figure 2:
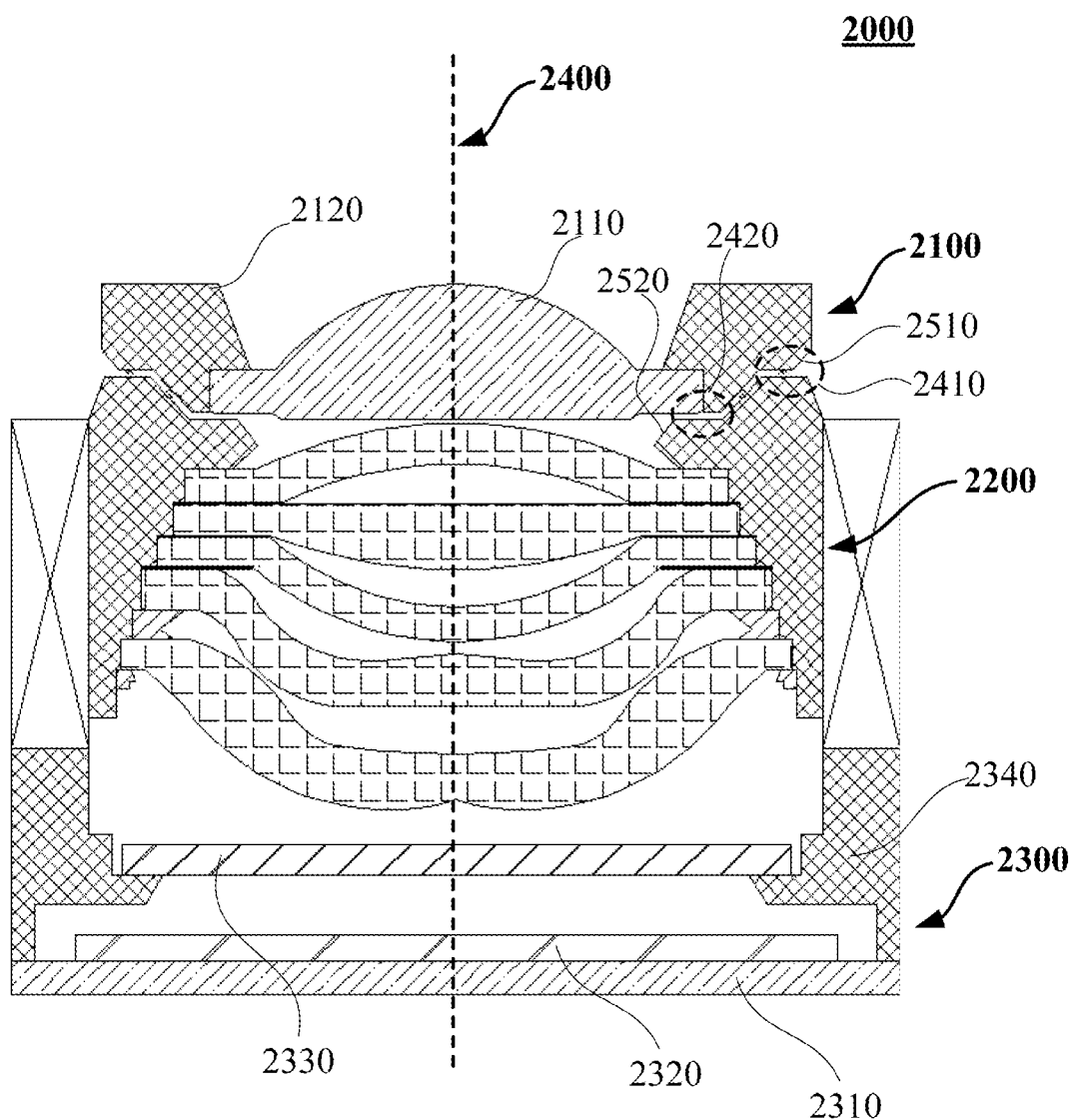
FIG. 2 is a cross-sectional view of an imageable optical device 2000 according to an embodiment of the present application.

FIG. 1 shows a flow chart of a method 1000 for manufacturing a camera module according to an embodiment of the present application. FIG. 2 shows a cross-sectional view of a camera module 2000 according to an embodiment of the present application. It should be noted that although the embodiments shown in FIGS. 1 and 2 are the manufacturing process and structure of the camera module, in other embodiments of the present application, without loss of generality, the camera module may also be replaced by other imageable optical devices such as optical lens or the like.

Referring to FIG. 1, the manufacturing method includes the following steps S1100-S1500.

Firstly, in step S1100, at least two lens components separated from each other and each of them including at least one lens are prepared. In a conventional imageable optical device, multiple lenses are assembled in a same lens barrel. In this case, relative positions of each lens are basically determined, and almost impossible to adjust. This means that once the lenses are assembled in the lens barrel, the quality of the lenses is determined. Therefore, the conventional camera module manufacturing process has high requirements for the processing accuracy of the lens barrel and the lens. According to the present application, at least two lens components separated from each other and each of them including at least one lens may be prepared. The "preparation" mentioned herein includes the act and/or step of manufacturing the lens component, as well as the act and/or step of obtaining the lens component in other ways. The relative positions of these lens components may be adjusted in a manner described below. Although in the embodiment shown in FIG. 2, only two lens components are prepared, those skilled in the art may understand that number of lens components may be determined according to actual requirements, without being particularly limited.

In the embodiment shown in FIG. 2, two lens components are prepared for a camera module 2000, hereinafter referred to as a first lens component 2100, and a second lens component 2200 respectively. In the preparation of the lens components, each of the first lens component 2100 and the second lens component 2200 may be equipped with at least one lens. For example, in the embodiment shown in FIG. 2, the first lens component 2100 is equipped with one lens 2110, and the lens component 2200 is equipped with five lenses. However, those skilled in the art may easily understand that the number of lens included in each lens component may be determined according to actual needs, and is not particularly limited. For example, the first lens component 2100 may be equipped with two, three, or four lenses, and the second lens component 2200 may be equipped with one, two, three, or four lenses.

In the embodiment shown in FIG. 2, a lens barrel is also provided for each lens component. For example, the first lens component 2100 is equipped with a lens barrel 2120. The lens barrel may be a single lens barrel 2120 as included in the first lens component 2100 in FIG. 2, or a double-lens barrel as included in the second lens component 2200 in FIG. 2, for example, an inner lens barrel nested together with an outer lens barrel. The function of the lens barrel is to fix the corresponding lens and maintain relative positions of multiple lenses in the same lens barrel. Therefore, when a certain lens component is equipped with only one lens barrel, the lens barrel may also be omitted.

In step S1200, the prepared at least two lens components are pre-positioned along an optical axis, so that the at least two lens components are able to form an image, wherein a first structural gap and a second structural gap are arranged at different positions between the two adjacent lens components. Various grasping mechanisms may be used to grasp various lens components, and various fixing mechanisms may be used to fix various lens components to be pre-positioned. In this case, a relative displacement of the grasping mechanism with respect to the fixing mechanism may be controlled to pre-position the at least two lens components. For example, in the embodiment shown in FIG. 2, the second lens component 2200 may be clamped and fixed by a fixing mechanism (not shown), and the first lens component 2100 may be clamped by a grasping mechanism (not shown). Then, the grasping mechanism is controlled to drive the first lens component 2100 to approach the second lens component 2200. During the approaching process, it should generally be ensured that the first lens component 2100 and the second lens component 2200 do not contact each other, and there are a first structural gap 2410 and a second structural gap 2420 at different positions between them. After pre-positioning, the at least two lens components should have imaging capability to ensure the subsequent active alignment process. The structural gap may be used to dispense adhesive to connect the adjacent lens components, related contents will be described in more detail below. In this embodiment, the structural gap may be understood as a gap between the structural surfaces of the lens components that may contain adhesive. A structural surface of a lens component may be a bottom surface or a top surface of a lens barrel, or a non-optical surface of a lens.

In order to make the structural gap have a uniform shape to facilitate uniform dispensing of the adhesive, when the lens components are prepared, the surfaces of two adjacent lens components corresponding to the first structural gap may be shaped to fit with each other. Similarly, the surfaces of two adjacent lens components corresponding to the second structural gap may be shaped to fit each other. Referring to FIG. 2, a lower surface of the first lens component 2100 corresponding to the first structural gap 2410, and an upper surface of the second lens component 2200 corresponding to the first structural gap 2410 are shaped to have shapes that fit each other. Similarly, a lower surface of the first lens component 2100 corresponding to the second structural gap 2420, and an upper surface of the second lens component 2200 corresponding to the second structural gap 2420 are shaped to have shapes that fit each other.

When the adhesive filled in the first structural gap 2410 and the second structural gap 2420 is same, not only the surfaces of two adjacent lens components corresponding to the structural gap are shaped to fit each other, but also the first structural gap 2410 and the second structural gap 2420 are also pre-positioned to have approximately same width. By maintaining the first structural gap 2410 and the second structural gap 2420 to have substantially the same width, the adhesive dispensed in the two structural gaps may have substantially same thickness. In this case, amount of variation produced during curing of the adhesive is approximately same. Optionally, when the first lens component 2100 and the second lens component 2200 are pre-positioned, the first lens component 2100 and the second lens component 2200 may be close to each other along an optical axis 2400 until width of the first structural gap 2410 and the second structural gap 2420 is in the range of 30-300 μm, preferably in the range of 30-100 μm. This width range may not only ensure that the adjacent lens components have sufficient adjustment space during the active alignment process described below, but also minimize amount of adhesive used, thereby reducing the influence on the imageable optical device of the deformation of the adhesive during curing, and the deformation of the adhesive caused by environmental factors during long-term use after the adhesive is cured.

In step S1300, relative positions of at least two pre-positioned lens components are adjusted through active alignment. During the active alignment process, based on an optical imaging result, the relative position of a movable lens component may be adjusted with respect to the other fixed lens component, so as to meet a predetermined imaging quality, such as a predetermined resolution. The adjustment of the relative positions of adjacent lens components during the active alignment process may include: a translation along an optical axis direction, a translation perpendicular to the optical axis direction, a rotation around the optical axis, and a tilt adjustment. The translation along the optical axis direction, the translation perpendicular to the optical axis direction, and the change of the first structural gap 2410 and the second structural gap 2420 during the active alignment process may be regarded as a fine adjustment amount.

For example, the camera module 2000 may further include a photosensitive assembly 2300. The photosensitive assembly 2300 may include a circuit board 2310, a photosensitive element 2320 mounted on the circuit board 2310, a cylindrical support 2340 fabricated on the circuit board 2310 and surrounding the photosensitive element 2320, and a color filter element 2330 mounted on the support 2340. The cylindrical support 2340 has an extending portion that extends inward (referring to the direction toward the photosensitive element 2320) and may be used as a lens frame, and the color filter element 2330 is mounted on the extending portion. The cylindrical support 2340 also has an upper surface through which the photosensitive assembly may be connected with other assemblies of the camera module (for example, the second lens component 2200). Of course, it is easy to understand that in other embodiments, the photosensitive assembly 2300 may also be other structure. For example, the circuit board of the photosensitive assembly has through-holes, and the photosensitive element is installed in the through-holes of the circuit board; and for example, the support portion is formed around the photosensitive element by molding and extends inward and contacts the photosensitive element (for example, the supporting portion covers at least part of the non-photosensitive area at the edge of the photosensitive element); for another example, the photosensitive assembly may also omit the color filter element.

In the process of adjusting the relative positions of the first lens component 2100 and the second lens component 2200 through the active alignment, a fixing mechanism (not shown) may be used to clamp and fix the second lens component 2200, and a grasping mechanism (not shown) is used to clamp the first lens component 2100. Then, the position of the first lens component 2100 relative to the second lens component 2200 is finely adjusted according to the optical imaging result collected by the photosensitive assembly 2300. For example, a translational position of the first lens component 2100 relative to the second lens component 2200 may be adjusted, such as a X translation amount, a Y translation amount, and a Z translation amount in a rectangular coordinate system. In addition, an angle of the first lens component 2100 relative to the second lens component 2200 may also be adjusted, such as a yaw angle (Yaw), a pitch angle (Pitch), and a roll angle (Roll).

In step S1400, a first adhesive is dispensed in the first structural gap and a second adhesive is dispensed in the second structural gap.

According to an embodiment of the present application, the first adhesive may be a light curing adhesive. For example, the first adhesive may be an ultraviolet (UV) curing adhesive. The photoinitiator (or photosensitizer) in the UV curing adhesive generates active free radicals or cations after absorbing UV under UV irradiation, and initiates monomer polymerization and crosslinking chemical reactions, so that the adhesive may be converted from liquid into solid in a short time. Alternatively, the first adhesive may be a photothermal curing adhesive. The photothermal curing adhesive may be cured under the conditions of light irradiation of corresponding spectrum and heating, for example, UV thermosetting adhesive. When the first adhesive is a light curing adhesive or a photothermal curing adhesive, the first structural gap 2410 should have a light-receiving opening to facilitate subsequent adhesive curing operations.

According to an embodiment of the present application, the second adhesive may be a heat curing adhesive, for example, epoxy resin or the like. A heat curing adhesive may be cured under heating conditions.

According to another embodiment of the present application, the second adhesive may also be a photo-thermal curing adhesive.

Although the light curing adhesive, heat curing adhesive, and photo-thermal curing adhesive are shown as examples of the first adhesive and the second adhesive in this application, those skilled in the art should understand that the types of the first adhesive and the second adhesive are not limited to these. Any type of adhesive may be used according to actual needs. For example, a catalyst may also be used to cure the adhesive. The arrangement position and material of the first adhesive and the second adhesive are suitable for enabling the first adhesive and the second adhesive to be cured successively at different times. For example, when the first adhesive and the second adhesive are both photo-thermal curing adhesives, adhesives with different curing temperatures may be selected; or the light opening of the first structural gap and the lighting opening the second structural gap may be arranged to be independent of each other in terms of receiving light.

According to an embodiment of the present application, when preparing at least two lens components that are separated from each other and each includes at least one lens, the surfaces of the two adjacent lens components corresponding to the first structural gap may be shaped to extend away from the direction of the optical axis and face the outer openings of the at least two lens components; and the surfaces of the two adjacent lens components corresponding to the second structural gap may be shaped to extend toward the direction of the optical axis and face the inner openings of the at least two lens components. As shown in FIG. 2, the surfaces of the first lens component 2100 and the second lens component 2200 corresponding to the first structural gap 2410 respectively extend away from the optical axis 2400, and face the outside of the first lens component 2100 and the second lens component 2200 to form a first opening 2510. The first opening 2510 may be used to receive light used for curing the first adhesive. In addition, the surfaces of the first lens component 2100 and the second lens component 2200 corresponding to the second structural gap 2420 respectively extend toward the optical axis 2400, and form a second opening toward the inside of the first lens component 2100 and the second lens component 2200 2520. In the case that the second adhesive is a photo-thermal curing adhesive, the second opening 2520 may be arranged with a certain inclination angle so as to prevent contamination of the lens by external impurities.

In step S1500, the first adhesive and the second adhesive are cured in sequence. For example, when the first adhesive is a light curing adhesive or a photo-thermal curable adhesive, light to which the first adhesive is sensitive may be used to irradiate the first adhesive. For example, UV may be used to irradiate UV curing adhesive or UV thermosetting adhesive. According to the ingredients and properties of the first adhesive, it may also be provided with a suitable curing temperature. When the second adhesive is a heat curing adhesive or a photo-thermal curing adhesive, a suitable curing temperature may be provided for the second adhesive according to the ingredients and properties of the second adhesive. In step S1500, the curing conditions of the first adhesive and the second adhesive are properly arranged to ensure that the first adhesive and the second adhesive are cured sequentially. Further, the camera module may be pre-fixed by firstly curing the first adhesive to reduce the influence of the later manufacturing process on the camera module; and the second adhesive cured later may be used to increase the connection strength and reliability of the camera module. In this case, on one hand, the structural strength of the finally formed imageable optical device may be ensured; and on the other hand, the relative positions of the internal structures of the imageable optical device may be ensured during the flow of the process.

Some non-limiting examples are given below: during the preparation and assembly of the imageable optical device, some curing steps may involve movement of a semi-finished imageable optical device. During the movement, the relative position of its internal structure may be changed. Therefore, a step-by-step curing method may be used to cure the imageable optical device. For example, thermosetting adhesive or UV thermosetting adhesive needs to be baked at a higher temperature to achieve design strength. This baking operation is often performed on another device separated from the device performing the active alignment. Therefore, an imageable optical device in a semi-finished state will undergo movement. In this case, for example, the UV curing adhesive or UV thermosetting adhesive filled in the first structural gap may be exposed on the machine for a short time to achieve the pre-fixing effect. Then, the imageable optical device may be moved into the baking chamber for baking, so as to completely cure the UV thermosetting adhesive or thermosetting adhesive filled in the second structural gap. In this process, the adhesive in the first structural gap may also be fully cured.

It should be noted that there is no clear sequence between step S1300 and step S1400 in FIG. 1. That is, the method 1000 may be executed sequentially in an order of S1100→S1200→S1300→S1400→S1500, or may be executed in an order of S1100→S1400→S1200→S1300→S1500. If the active alignment (S1300) is performed before the adhesive dispensing (S1400), the adhesive dispensing process may have sufficient time. If the adhesive dispensing (S1400) is performed before the active alignment (S1300), it may be ensured that the process of active alignment has taken into account the partial influence of the adhesive dispensing, thus the active alignment and adhesive curing may be closer to in-situ process.

Figure 3A:
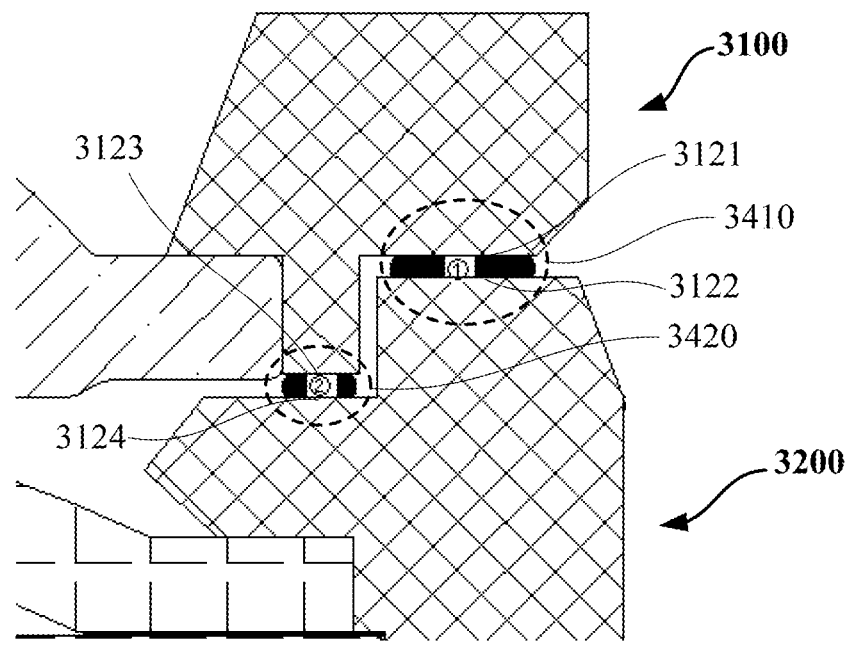
FIGS. 3A and 3B are partially enlarged cross-sectional views of two adjacent lens components according to an embodiment of the present application.
Figure 3B:
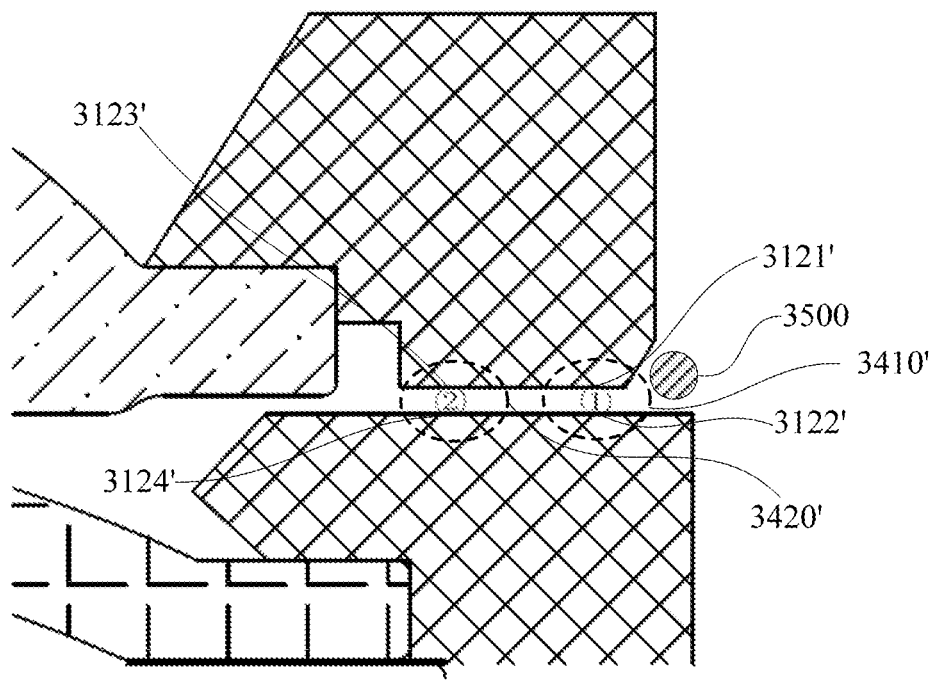

FIGS. 3A and 3B are partially enlarged cross-sectional views of two adjacent lens components according to an embodiment of the present application.

In the embodiment shown in FIG. 3A, the surfaces of two adjacent lens components corresponding to the first structural gap and the second structural gap are all shaped to be perpendicular to the optical axis. Particularly, in the embodiment shown in FIG. 3A, the optical axis direction is the vertical direction. The surface 3121 of the first lens component 3100 corresponding to the first structural gap 3410, and the surface 3122 of the second lens component 3200 corresponding to the first structural gap 3410 are parallel to each other, and both extend horizontally. In addition, the surface 3123 of the first lens component 3100 corresponding to the second structural gap 3420, and the surface 3124 of the second lens component 3200 corresponding to the second structural gap 3420 are parallel to each other, and both extend horizontally. In addition, the first structural gap 3410 and the second structural gap 3420 are spaced apart from each other. For example, there is a vertical isolation section between the first structural gap 3410 and the second structural gap 3420. The lens components are prepared into the configuration as described above, and when the camera module is placed vertically for curing, the adhesives are not easily affected by gravity to diffuse or mix in the structural gap.

In the embodiment shown in FIG. 3B, surfaces of any one of two adjacent lens components corresponding to the first structural gap and the second structural gap are shaped to be on a same horizontal plane. Particularly, in the embodiment shown in FIG. 3B, the surface 3121' of the first lens component corresponding to the first structural gap 3410', and the surface 3123' of the first lens component corresponding to the second structural gap 3420' are on a same horizontal plane. The surface 3122' of the second lens component corresponding to the first structural gap 3410', and the surface 3124' of the second lens component corresponding to the second structural gap 3420' are on a same horizontal plane. In this case, the light incident from the first structural gap 3410' may also reach the second structural gap 3420'. Therefore, UV thermosetting adhesive may be arranged in both of the first structural gap 3410' and the second structural gap 3420'. In addition, after curing the adhesives at the first structural gap 3410' and the second structural gap 3420' respectively, a waterproof reinforce adhesive may be arranged at an outer opening 3500 of the second structural gap to prevent external moisture from penetrating into the imageable optical device, the waterproof reinforce adhesive also has a function of reinforcing structure. The entire outer opening 3500 is filled with the waterproof reinforce adhesive, preferably the adhesive material is UV adhesive or UV thermosetting adhesive with the effect of waterproof after curing. The waterproof reinforce adhesive has a function of preventing the first adhesive and the second adhesive from absorbing moisture and mutating.

Figure 4:
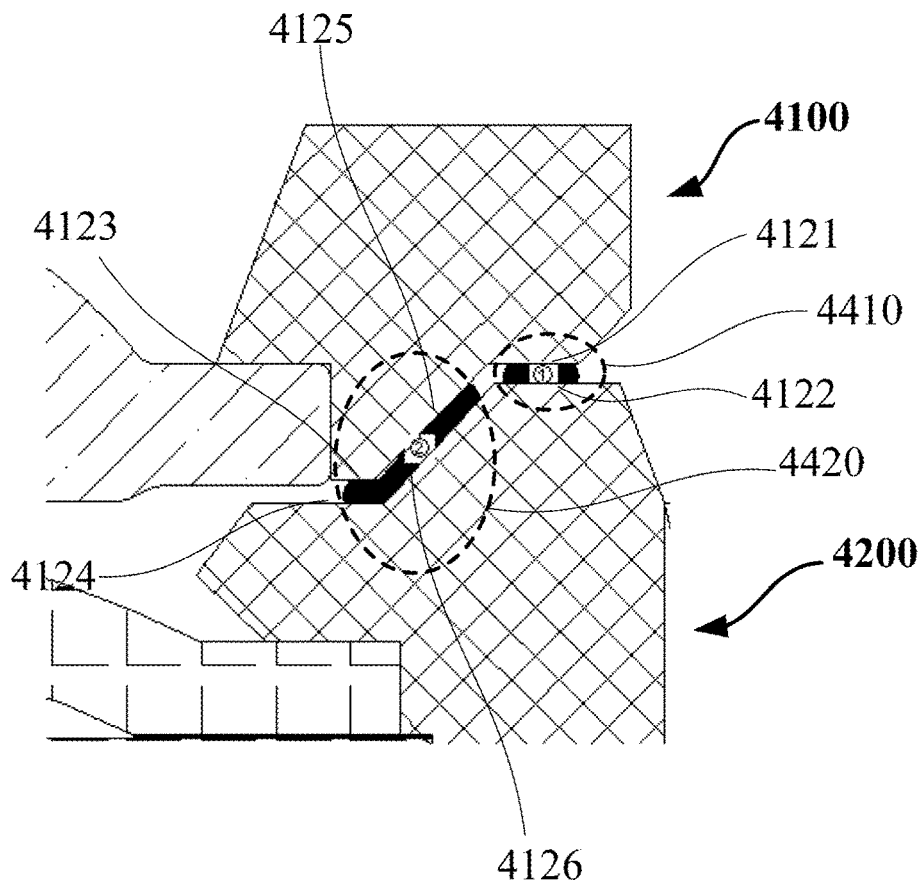
FIG. 4 is a partially enlarged cross-sectional view of two adjacent lens components according to another embodiment of the present application.

FIG. 4 is a partially enlarged cross-sectional view of two adjacent lens components according to another embodiment of the present application. In the embodiment shown in FIG. 4, surfaces of two adjacent lens components corresponding to the first structural gap are shaped to be perpendicular to the optical axis. In addition, surfaces of two adjacent lens components corresponding to the second structural gap are shaped to have inclination segments inclined with respect to the optical axis. Particularly, in the embodiment shown in FIG. 4, the optical axis direction is the vertical direction. The surface 4121 of the first lens component 4100 corresponding to the first structural gap 4410, and the surface 4122 of the second lens component 4200 corresponding to the first structural gap 4410 are parallel to each other, and both extend horizontally. In addition, the surface 4123 of the first lens component 4100 corresponding to the second structural gap 4420, and the surface 4124 of the second lens component 4200 corresponding to the second structural gap 4420 have inclination segments 4125 and 4126 that are inclined with respect to the optical axis. In addition, the width of the first structural gap 4410 and the width of the second structural gap 4420 may be substantially the same. By arranging a structural gap with an inclined channel, an area where the adhesive is dispensed may be increased, thereby enhancing the adhesion between adjacent lens components. In addition, since the adhesive dispensing area is increased, a smaller structural gap width may be configured under same bonding strength. In addition, the surface corresponding to the first structural gap may also be shaped to be inclined with respect to the optical axis, and the inclination segment may also have a certain radian.

Figure 5:
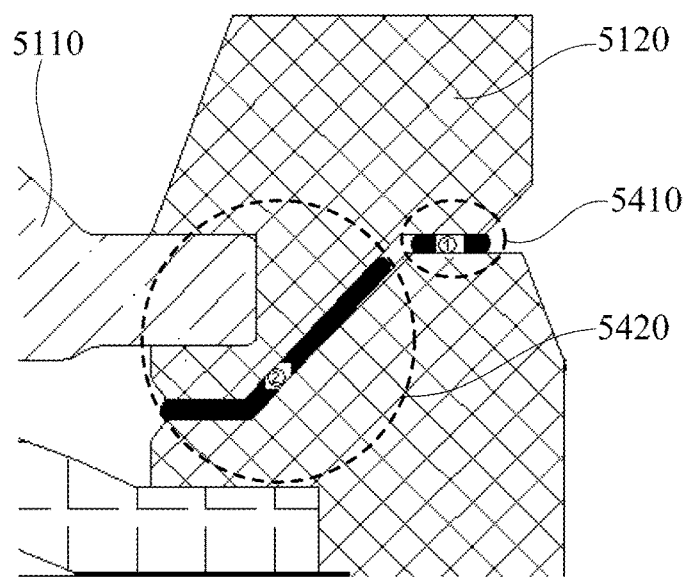
FIG. 5 is a partially enlarged cross-sectional view of two adjacent lens components according to another embodiment of the present application.

FIG. 5 is a partially enlarged cross-sectional view of two adjacent lens components according to another embodiment of the present application. In the embodiment shown in FIG.

5, a lens barrel 5120 is shaped to wrap at least part of an upper surface and a lower surface of the lens 5110. In addition, the first structural gap 5410 or the second structural gap 5420 has an overlapping area with at least part of the lens surface wrapped by the lens barrel 5120 along the direction of the optical axis. By configuring the lens barrel to wrap the lens, a larger area may be provided for the connection of adjacent lens components, thereby enhancing the adhesion between adjacent lens components.

Figure 6:
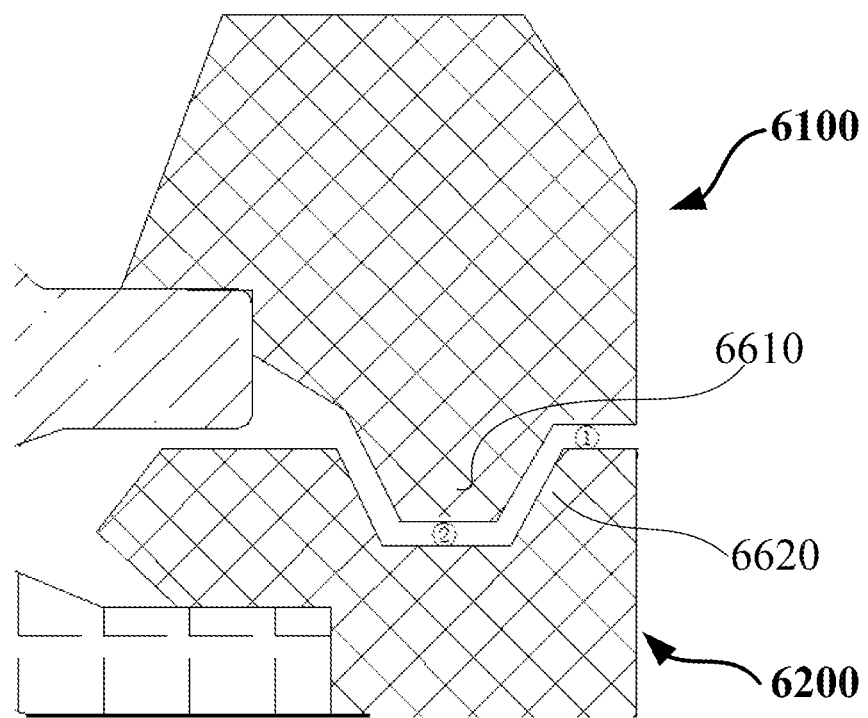
FIG. 6 is a partially enlarged cross-sectional view of two adjacent lens components according to another embodiment of the present application.

FIG. 6 is a partially enlarged cross-sectional view of two adjacent lens components according to another embodiment of the present application. In the embodiment shown in FIG. 6, when preparing the lens assembly: a connecting protrusion part is formed on one of the two adjacent lens components; and a connecting recess part that fits and receives the connecting protrusion part is formed on the other lens component of the two adjacent lens components. Particularly, in the embodiment shown in FIG. 6, the connecting protrusion part 6610 is formed on the first lens component 6100 of the adjacent first lens component 6100 and second lens component 6200, and the connecting recess part 6620 is formed on the second lens component 6200. The shape of the connecting recess part 6620 approximately matches the shape of the connecting protrusion part 6610, and may receive the connecting protrusion part 6610. The shape relationship between the connecting protrusion part and the connecting recess part is not particularly limited, as long as a certain gap may be reserved between the connecting protrusion part 6610 and the connecting recess part 6620 to form a first structural gap and a second structural gap when the camera module is manufactured. In addition, the width of the first structural gap and the width of the second structural gap may be substantially the same. Since the connecting protrusion part 6610 and the connecting recess part 6620 are fitted with each other as upper and lower parts, the structural strength of the camera module after manufacturing is increased. For example, the impact in a lateral direction perpendicular to the optical axis may be offset by the elastic force between the parts fitted with each other.

When preparing such a connecting protrusion part and a connecting recess part, the connecting protrusion part may be formed to have at least one of trapezoidal, triangular, rectangular, semi-circular, and double-triangular shape in a cross section parallel to the optical axis. It is easy to understand that at this time, the connecting recess part has a shape matching the connecting protrusion part.

Figure 7:
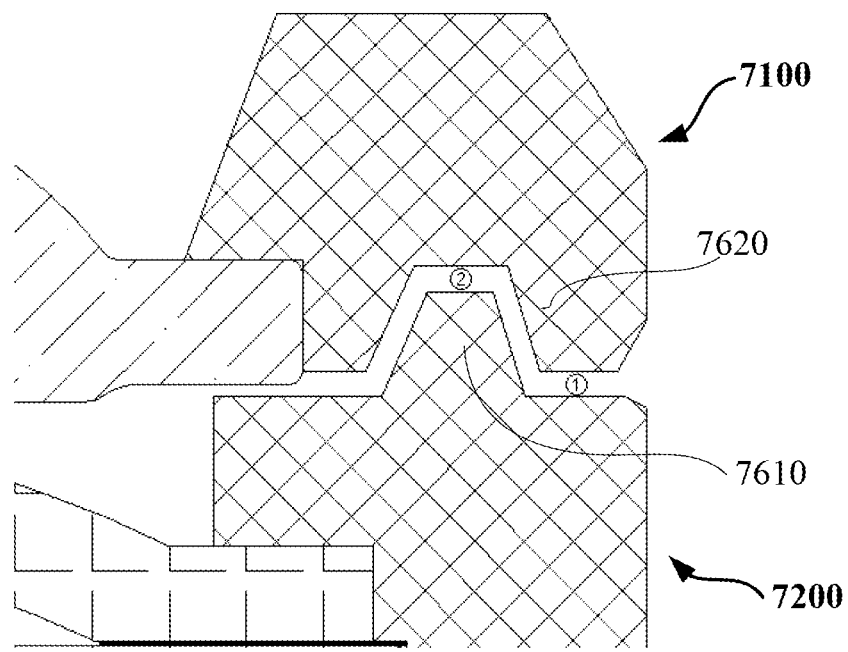
FIG. 7 is a partially enlarged cross-sectional view of two adjacent lens components according to another embodiment of the present application.

FIG. 7 is a partially enlarged cross-sectional view of two adjacent lens components according to another embodiment of the present application. Except for the positions where the connecting protrusion part and the connecting recess part are formed, the embodiment shown in FIG. 7 is substantially the same as the embodiment shown in FIG. 6. In the embodiment shown in FIG. 7, a connecting protrusion part 7610 is formed on the second lens component 7200 of the adjacent first lens component 7100 and second lens component 7200, and a connecting recess part 7620 is formed on the first lens component 7100. The shape of the connecting recess part 7620 matches the shape of the connecting protrusion part 7610, and may receive the connecting protrusion part 7610.

Figures 8A, 8B:
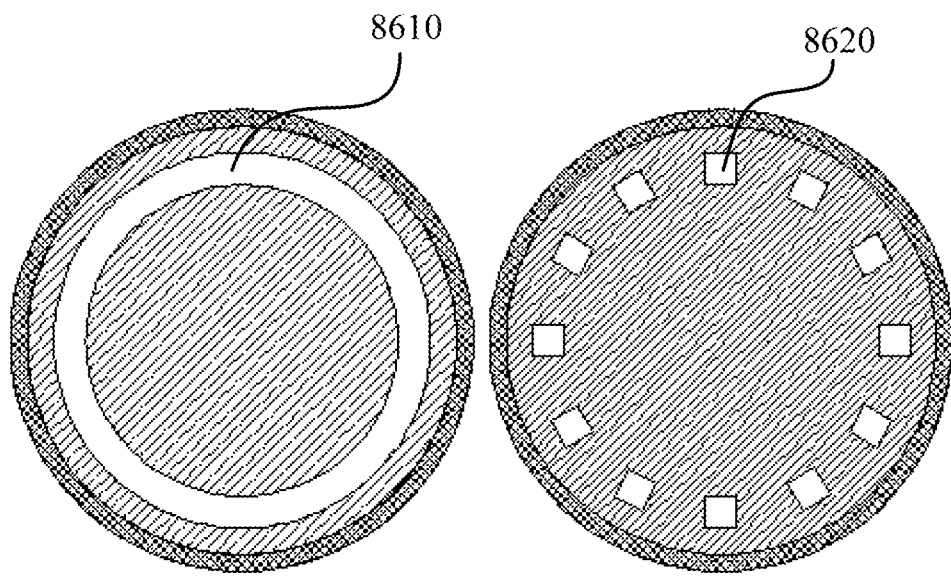
FIGS. 8A and 8B are schematic diagrams of a shape of a connecting protrusion part on a cross section perpendicular to an optical axis.

FIGS. 8A and 8B are schematic diagrams of the shapes of the connecting protrusion part on a cross section perpendicular to the optical axis. As shown in FIG. 8A, the connecting protrusion part 8610 may be formed to have a continuous shape in a cross section perpendicular to the optical axis, such as a closed ring. In this case, the attachment surface of the adhesive is relatively large. As the attachment surface of the adhesive is increased, a smaller structural gap width may be configured under the same bonding strength and adhesive amount. Alternatively, as shown in FIG. 8B, the connecting protrusion part 8710 may be formed to have a discrete shape in a cross section perpendicular to the optical axis. These discrete connecting protrusion parts 8710 may have unequal intervals between each other, but preferably, they may have equal intervals. For example, the connecting protrusion parts 8710 may be formed on a circle at equal intervals around the optical axis.

Referring to FIG. 2, the present application also provides a camera module 2000. The camera module 2000 includes: at least two lens components, each of the at least two lens components includes at least one lens and is positioned sequentially along the optical axis, and there are a first structural gap and a second structural gap at different positions of the two adjacent lens components; a first adhesive, the first adhesive is arranged in the first structural gap; and a second adhesive, the second adhesive is arranged in the second structural gap, wherein arrangement positions and material of the first adhesive and the second adhesive are adapted to enable the first adhesive and the second adhesive to be cured successively at different times.

When the first adhesive is different from the second adhesive, the first structural gap and the second structural gap may be spaced apart from each other to prevent the first adhesive and the second adhesive from being mixed with each other. At least one of the at least two lens components may further include a lens barrel. The lens barrel may wrap at least part of an upper surface and a lower surface of the lens. In this case, the first structural gap or the second structural gap has an overlap area with the at least part of the lens surface wrapped by the lens barrel along the direction of the optical axis.

Surfaces of two adjacent lens components corresponding to the first structural gap may extend away from the direction of the optical axis and face an outer openings of the at least two lens components. In addition, surfaces of two adjacent lens components corresponding to the second structural gap may extend toward the direction of the optical axis and face an inner openings of the at least two lens components. The inner opening may be arranged with a certain inclination angle so as to prevent contamination of the lens by external impurities. The inner opening may also prevent lens contamination caused by overflowing adhesive.

The surfaces of two adjacent lens components corresponding to the first structural gap may fit with each other. The surfaces of two adjacent lens components corresponding to the second structural gap may fit with each other. The surfaces of two adjacent lens components corresponding to the first structural gap and the second structural gap may be perpendicular to the optical axis. The surfaces of two adjacent lens components corresponding to the first structural gap and the second structural gap are on a same horizontal plane. Alternatively, The surfaces of two adjacent lens components corresponding to the first structural gap may be perpendicular to the optical axis; and the surfaces of two adjacent lens components corresponding to the second structural gap may has an inclination segment inclined with respect to the optical axis. Alternatively, one of the two adjacent lens components may include a connecting protrusion part protruding toward the other lens component; and the other of the two adjacent lens components may include a connecting recess part fitting and receiving the connecting protrusion.

The connecting protrusion part may have at least one shape of a trapezoidal, triangular, rectangular, semi-circular, and double-triangular shape and the like in a cross section parallel to the optical axis. The connecting protrusion part may have a continuous shape in a cross section perpendicular to the optical axis. Alternatively, the connecting protrusion part may have a discrete shape in a cross section perpendicular to the optical axis. In this case, the connecting protrusion parts may be arranged at equal intervals around the optical axis (may be unequal intervals, preferably equal intervals).

The first structural gap and the second structural gap may have a same width.

The first adhesive may be a light curing adhesive, or a photothermal curing adhesive. In this case, the first structural gap may have a light-receiving opening.

The second adhesive may be a heat curing adhesive.

The second adhesive may be a photo-thermal curing adhesive. In this case, the second structural gap has a light-receiving opening.

The optical lens with an air escape channel according to the present application will be described in detail below with reference to the accompanying drawings. This application mainly discusses multi-group optical lens (also called lens module).

Figure 9:
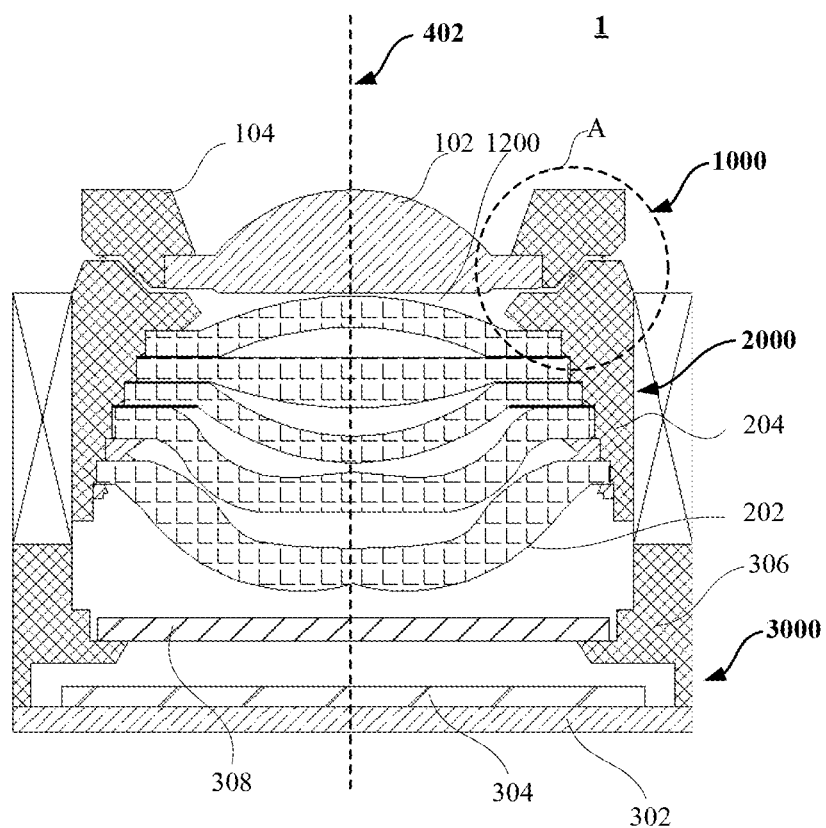
FIG. 9 is a cross-sectional view schematically showing a camera module including an optical lens according to the present application.

FIG. 9 is a cross-sectional view schematically showing the camera module 1 including the optical lens according to the present application.

According to an embodiment of the present application, the camera module 1 includes an optical lens and a photosensitive assembly, wherein the optical lens includes: a first sub-lens 1000, including at least one first lens 102 and a first lens barrel 104 accommodating the first lens 102; a second sub-lens 2000, including at least one second lens 202 and a second lens barrel 204 accommodating the second lens 202; adhesive 6000 (as shown in FIGS. 18A-21B), bonding the first sub-lens 1000 and the second sub-lens 2000 together, wherein the adhesive 6000, the first sub-lens 1000 and the second sub-lens 2000 jointly form a cavity 1200, and a part of at least one of the first lens 102, the first lens barrel 104, the second lens 202, the second lens barrel 204, and the adhesive 6000 forms an air escape channel (described in detail later), one end of the air escape channel leads to the cavity 1200, and the other end of the air escape channel leads to outside.

Correspondingly, an assembly method of the optical lens according to the present application includes: accommodating and installing at least one first lens in a first lens barrel to form a first sub-lens; accommodating and installing at least one second lens in a second lens barrel to form a second sub-lens; and bonding the first sub-lens and the second sub-lens together by using adhesive, wherein the adhesive, the first sub-lens and the second sub-lens jointly form a cavity, wherein the assembly method further includes: in the process of bonding the first sub-lens and the second sub-lens, an air escape channel is formed by a through-hole and/or a gap arranged in at least one of the first lens, the first lens barrel, the second lens, the second lens barrel, and the adhesive, so that the air in the cavity is in communication with outside, and wherein one end of the air escape channel leads to the cavity, and the other end of the air escape channel leads to the outside.

In some embodiments, the first sub-lens 1000 may only include a single first lens 102 without including the first lens barrel 104. For example, the first lens 102 may be directly adhered to the second sub-lens 2000 by using the adhesive 6000. The rest of the configuration and the installation method of this embodiment are similar to the embodiment including the first lens barrel 104, therefore, only the embodiment including the first lens barrel 104 will be described in detail as an example herein.

The first sub-lens 1000 is arranged as an upper lens component and includes a first lens 102 and a first lens barrel 104. The first lens 102 has a convex part with a circular shape in a plane view at the center for optical imaging; and has a flat outer edge part at periphery so as to be accommodated in the first lens barrel 104. During the imaging process, the convex part of the first lens 102 is an effective area for transmitting light, and the outer edge part of the first lens 102 is an ineffective area.

Corresponding to the structure of the first lens 102, a center of the first lens barrel 104 is hollow to accommodate the first lens 102 and allow light to pass through the first lens 102; an inner circumferential side of the first lens barrel 104 has a concave flat step portion. By connecting and fixing the step portion of the first lens barrel 104 with the outer edge portion of the first lens 102, the first lens 102 and the first lens barrel 104 are connected together to form the first sub-lens 1000.

The second sub-lens 2000 is arranged as a lower lens component and includes a second lens 202 and a second lens barrel 204. Elements of the second sub-lens 2000 and connection manner between the elements may be similar to those of the first sub-lens 1000, and the description will not be repeated herein but only differences will be illustrated. As shown in FIG. 9, unlike the first lens 102 including only one lens, the second lens 202 includes five lenses.

It is worth mentioning that number of the first lens 102 and the second lens 202 is only an example and not a limitation. For example, the second lens 202 may be arranged as one, two, three, four lens, etc. In addition, each lens should be broadly understood as including a single lens or a lens stack adhered together, or a lens stack formed in other ways. In addition, the first sub-lens 1000 is not limited to the upper lens component, and the second sub-lens 2000 is not limited to the lower lens component. For example, the first sub-lens 1000 may be the lower lens component.

The first sub-lens 1000 and the second sub-lens 2000 are bonded together by the adhesive 6000. Particularly, the first lens barrel 104 of the first sub-lens 1000 and the second lens barrel 204 of the second sub-lens 2000 are bonded together by the adhesive 6000 (which will be described in detail later), so that the first lens 102 and the second sub-lens 2000 are combined into an optical system with clear imaging, similar object images, and small deformation (persons skilled in the art should know that under ideal conditions, for example, a center vertical lines of the first lens 102 and all of the second lens 202 are aligned on the optical axis 402 of the camera module to form the optical system), and a cavity 1200 is formed between the first sub-lens 1000 and the second sub-lens 2000.

In assembly process, in order to cure the adhesive bonding the first sub-lens 1000 and the second sub-lens 2000, the optical lens (particularly, the adhesive 6000) needs to be baked. Therefore, the air in the cavity 1200 may undergo heat-expansion or cold-contraction due to the temperature difference between baking and after baking, and this may affect the imaging accuracy of the optical lens. Therefore, an air escape channel (not shown in FIG. 9) is arranged in the optical lens according to the present application so as to communicate the cavity 1200 with outside to exhaust the air. The air escape channel may be arranged in at least one of the first lens 102, the first lens barrel 104, the second lens 202, the second lens barrel 204 and the adhesive 6000, and may have various forms as long as the above functions may be realized, this will be described in detail later.

In addition, except for the above-mentioned optical lens, the camera module 1 also includes a photosensitive assembly 3000 that receives an image formed by the first lens 102 and the second lens 202. The photosensitive assembly 3000 may include: a circuit board 302 with a resistance-capacitance element, a photosensitive element 304 mounted on the circuit board 302, a cylindrical support 306 made on the circuit board 302 and surrounding the photosensitive element 304, and a light filter element 308 mounted on the support 306 above the photosensitive element 304.

The air escape channel of the optical lens according to the present application will be described in detail below with reference to FIGS. 10-21B. For clarity of illustration, FIGS. 10-21B may only show a connection part displaying the first sub-lens 1000 and the second sub-lens 2000, and a portion displaying the cavity 1200 of the optical lens 1 in FIG. 9; particularly, only a circled part A in FIG. 9 is shown.

According to this application, a design of a multi-group lens module and at least one air escape channel is provided. The air escape channel is added to the components of the optical lens module, so that the air escape channel cooperates with an adjustment gap between the first sub-lens and the second sub-lens to provide an escape channel for air, and thereby the enclosed air between the first sub-lens and the second sub-lens is in communication with outside world. Herein, the air escape channel may be a hole, a channel, a groove, an interval, a gap, and the like for air escape, and its structure is not particularly limited, as long as it can meet the following requirements: the air may escape or discharge smoothly when undergoing heat-expansion or cold-contraction, so as to avoid excessive force on the adjacent components, which may cause deviation of relative positions of the two sub-lens or deformation of the optical system components, thereby affecting the optical performance.

In an alternative embodiment, one end of the air escape channel leading to the cavity has an opening being enlarged relative to the size of the air escape channel. Through such a design of increasing the size of the air escape channel, it is possible to prevent adhesive overflowing from the inside to block the air escape hole. Particularly, the gas pressure will change during baking. An opening with an enlarged size has a large cross-sectional area perpendicular to the gas flow direction and therefore has a slower flow rate; in contrast, when the gas flows through the air escape channel, since the air escape channel with a small size has a small cross-sectional area perpendicular to the gas flow direction, it will increase the gas flow rate and discharge the gas more quickly. In this way, it may avoid excessive force on the adjacent components caused by being heated too fast and without discharging the gas timely, thereby leading to deviation of the relative positions of the two sub-lenses or deformation of the optical system components.

In an alternative embodiment, the end of the air escape hole leading to the outside also has an opening, so that the adhesive has a larger contact area when sealing with the adhesive. Furthermore, the opening at the end of the air escape hole leading to the outside has an inclined inner surface. When sealing with the adhesive, the adhesive may fill the opening along the inclined surface, which facilitates the flow of adhesive, thereby filling the adhesive evenly. In addition, the inclined inner surface also has a function of containing overflowing adhesive.

In an alternative embodiment, the air escape channel may be an air escape hole arranged in at least one of the first lens, the first lens barrel, the second lens, and the second lens barrel.

In an alternative embodiment, the end of the air escape channel leading to the outside is sealed after the assembly of the optical lens is completed. In this way, foreign objects such as dust may be prevented from entering the inside of the optical lens from the air escape channel.

In an alternative embodiment, the air escape channel in a plane view may be roughly in a form of at least one of a straight line, broken line, and curved line (such as an S-shaped line), and may even be in other regular or irregular forms. For example, in the case that the air escape channel includes a gap, the air escape channel may have an irregular shape; this is because formation of a gap depends on the avoidance design of an adhesive dispensing path (particularly, a space naturally surrounded by the adhesive on both sides in the top view after adhesive dispensing) and an extrusion of upper and lower groups, and the gaps caused by each extrusion may be different. Compared with a straight line form, a broken line, curved line and other forms may also achieve the following effects: even if adhesive is not used to seal the outlet of the air escape channel, it may also prevent dust from entering the inside of the optical lens from the air escape channel. In this application, for convenience of illustration and description, a straight line and/or broken line form is used as an example to show the air escape channel.

Hereinafter, the air escape channel of the optical lens according to the first to twelfth embodiments of the present application will be described in detail with reference to FIGS. 10-21B. Particularly, FIGS. 10-15 show the air escape channels arranged in the first sub-lens 1000 (i.e., the upper lens component), and FIGS. 16-17B show the air escape channels arranged in the second sub-lens 2000 (i.e., the lower lens component), and FIGS. 18A-21B show the air escape channels arranged between the first sub-lens 1000 and the second sub-lens 2000.

Figure 10:
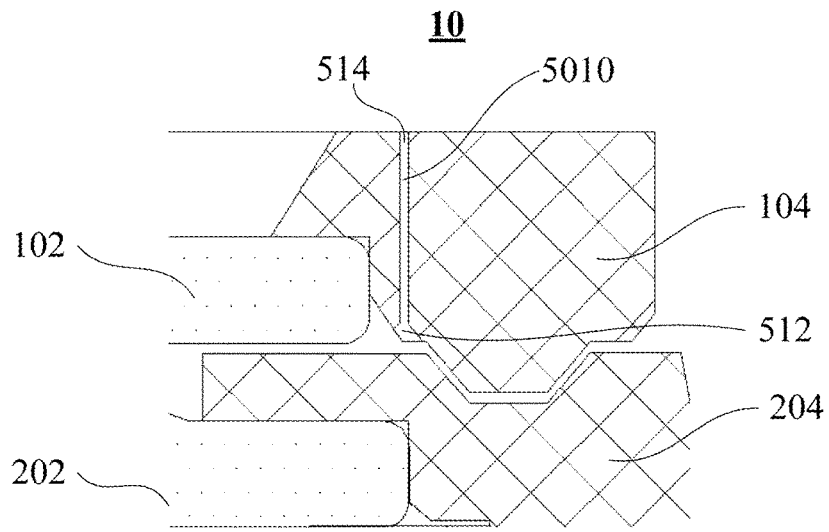
FIG. 10 is a cross-sectional view showing a first air escape channel of an optical lens according to the first embodiment of the present application.

FIG. 10 is a cross-sectional view showing a first air escape channel 5010 of an optical lens 10 according to a first embodiment of the present application.

According to the first embodiment of the present application, the first escape channel 5010 may be: an air escape hole arranged in the first lens barrel 104 in a direction parallel to the optical axis of the optical system consisting of the first lens and the second lens (for example, the vertical direction as shown in FIG. 10), or arranged in the first lens barrel 104 at an angle relative to the direction.

As shown in FIG. 10, for example, the first air escape channel 5010 may be vertically arranged in the first lens barrel 104. One end 512 (bottom) of the first air escape channel 5010 leading to the cavity 1200 is arranged with a relatively large opening to prevent adhesive from overflowing from the inside to block the air escape hole; the other end 514 of the first air escape channel 5010 leads to the outside, so that an internal space of the optical lens 10 is in communication with the outside to ensure a relatively stable air pressure, thereby preventing a rapid flow of air from exerting force on adjacent components.

Figure 11:
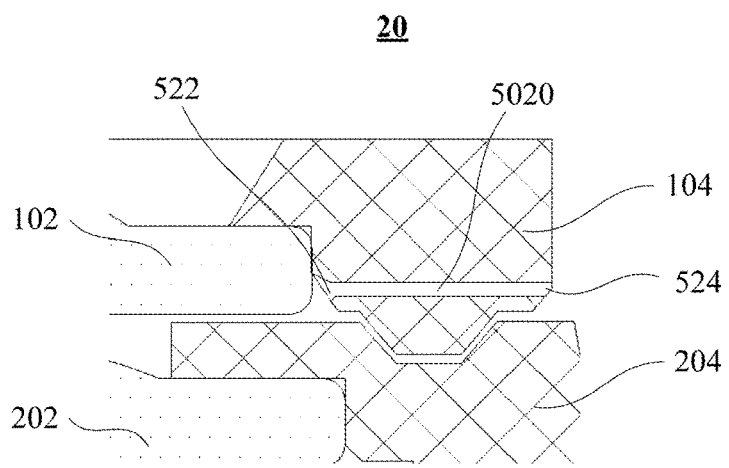
FIG. 11 is a cross-sectional view showing a second air escape channel of an optical lens according to the second embodiment of the present application.

FIG. 11 is a cross-sectional view showing a second air escape channel 5020 of an optical lens 20 according to a second embodiment of the present application.

According to the second embodiment of the present application, the second air escape channel 5020 may be: an air escape hole arranged in the first lens barrel 104 in a direction perpendicular to the optical axis of the optical system consisting of the first lens and the second lens (for example, the horizontal direction as shown in FIG. 11), or arranged in the first lens barrel 104 at an angle relative to the direction.

As shown in FIG. 11, for example, the second air escape channel 5020 may be horizontally arranged in the first lens barrel 104. One end 522 of the second air escape channel 5020 leading to the cavity 1200 is arranged with a relatively large opening to prevent adhesive from overflowing from the inside to block the air escape hole; the other end 524 of the second air escape channel 5020 leads to the outside, so that an internal space of the optical lens 20 is in communication with the outside to ensure a relatively stable air pressure, thereby preventing a rapid flow of air from exerting force on adjacent components.

Figure 12:
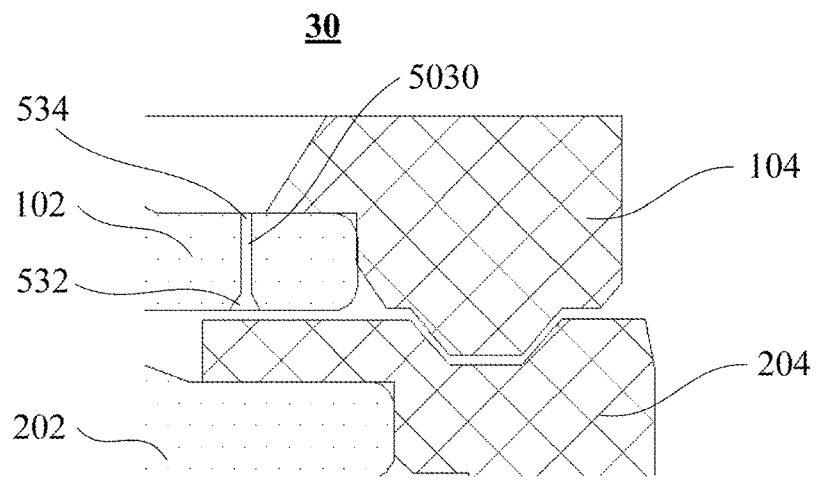
FIG. 12 is a cross-sectional view showing a third air escape channel of an optical lens according to the third embodiment of the present application.

FIG. 12 is a cross-sectional view showing a third air escape channel 5030 of an optical lens 30 according to a third embodiment of the present application.

According to the third embodiment of the present application, the third air escape channel 5030 may be: an air escape hole arranged in the ineffective area of the first lens 102 in a direction parallel to the optical axis of the optical system consisting of the first lens and the second lens, or arranged in the ineffective area of the first lens 102 at an angle relative to the direction. As explained above, the ineffective area of the first lens 102 represents the outer edge of the first lens 102 not involved in imaging. However, it should be understood that the ineffective area herein is only an example, and it may not be arranged on the outer circumference of the lens or have other configurations as long as it does not affect the imaging.

As shown in FIG. 12, for example, the third air escape channel 5030 may be vertically arranged in the ineffective area of the first lens 102. One end 532 of the third air escape channel 5030 leading to the cavity 1200 is arranged with a relatively large opening to prevent adhesive from overflowing from the inside to block the air escape hole; the other end 534 of the third air escape channel 5030 leads to the outside, so that an internal space of the optical lens 30 is in communication with the outside to ensure a relatively stable air pressure, thereby preventing a rapid flow of air from exerting force on adjacent components.

Figure 13A:
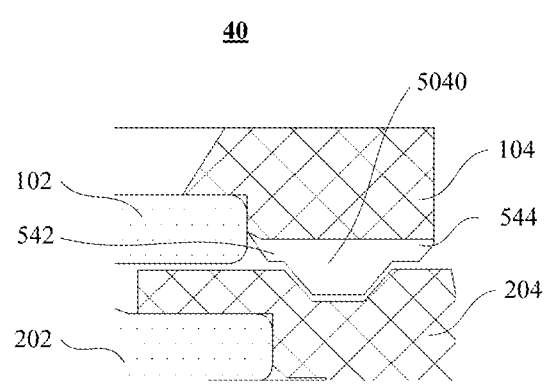
FIGS. 13A and 13B are cross-sectional views showing a fourth air escape channel of an optical lens according to the fourth embodiment of the present application.
Figure 13B:
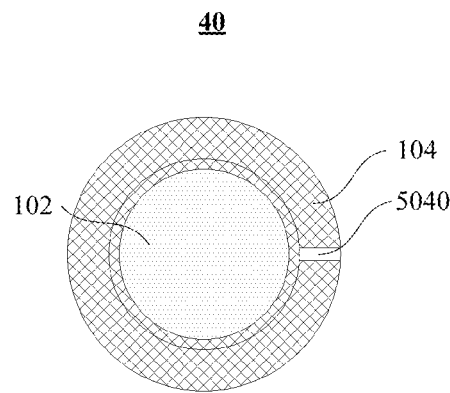

FIGS. 13A and 13B are a front cross-sectional view and a top cross-sectional view showing a fourth air escape channel 5040 of an optical lens 40 according to a fourth embodiment of the present application.

According to the fourth embodiment of the present application, the fourth air escape channel 5040 may be: a groove arranged at the surface of the first lens barrel 104 facing the second lens barrel 204.

As shown in FIGS. 13A and 13B, for example, the fourth air escape channel 5040 may be horizontally arranged in the first lens barrel 104, and is open toward the surface of the second lens barrel 204. One end 542 of the fourth air escape channel 5040 leading to the cavity 1200 is arranged with a relatively large opening to prevent adhesive from overflowing from the inside to block the air escape hole; the other end 544 of the fourth air escape channel 5040 leads to the outside, so that an internal space of the optical lens 40 is in communication with the outside to ensure a relatively stable air pressure, thereby preventing a rapid flow of air from exerting force on adjacent components.

Particularly, a larger groove may be arranged as an air escape channel by removing a part of the first lens barrel 104 facing the connecting surface, which may not only increase the size of the air channel, but also reduce the difficulty of making the air escape hole.

Figure 14:
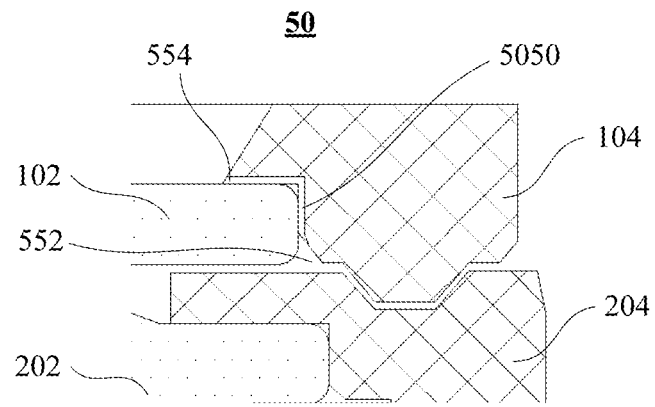
FIG. 14 is a cross-sectional view showing a fifth air escape channel of an optical lens according to the fifth embodiment of the present application.

FIG. 14 is a cross-sectional view showing a fifth air escape channel 5050 of an optical lens 50 according to a fifth embodiment of the present application.

According to the fifth embodiment of the present application, the fifth air escape channel 5050 may be an air escape groove arranged in the first lens barrel 104 along a contact boundary between the first lens barrel 104 and the first lens 102.

As shown in FIG. 14, for example, the fifth air escape channel 5050 may be arranged in the first lens barrel 104 along the first lens 102 in an L-shaped form. One end 552 of the fifth air escape channel 5050 leading to the cavity 1200 is arranged with a relatively large opening to prevent adhesive from overflowing from the inside to block the air escape hole; the other end 554 of the fifth air escape channel 5050 leads to the outside, so that an internal space of the optical lens 50 is in communication with the outside to ensure a relatively stable air pressure, thereby preventing a rapid flow of air from exerting force on adjacent components.

Figure 15:
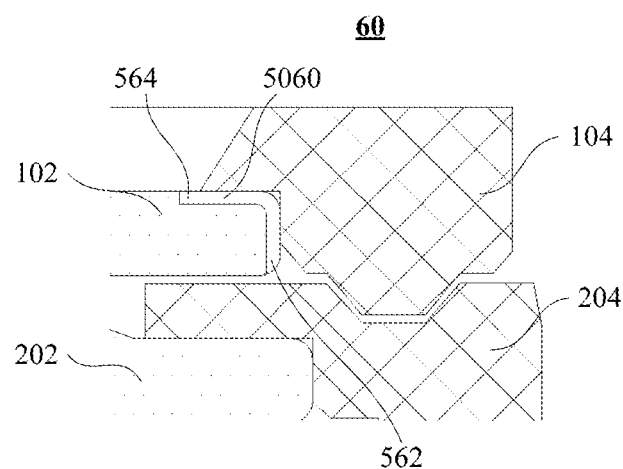
FIG. 15 is a cross-sectional view showing a sixth escape channel of an optical lens according to the sixth embodiment of the present application.
Figure 16:
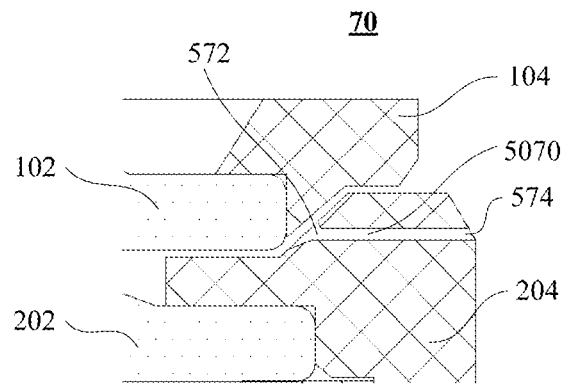
FIG. 16 is a cross-sectional view showing a seventh air escape channel of an optical lens according to the seventh embodiment of the present application.

FIG. 15 is a cross-sectional view showing a sixth air escape channel 5060 of an optical lens 60 according to a sixth embodiment of the present application.

According to the sixth embodiment of the present application, the sixth air escape channel 5060 may be an air escape groove arranged in the first lens 102 along the contact boundary between the first lens barrel 104 and the first lens 102.

As shown in FIG. 15, for example, the sixth air escape channel 5060 may be arranged in the first lens 102 along the first lens barrel 104 in an L-shaped form. One end 562 of the sixth air escape channel 5060 leading to the cavity 1200 is arranged with a relatively large opening to prevent adhesive from overflowing from the inside to block the air escape hole; the other end 564 of the sixth air escape channel 5060 leads to the outside, so that an internal space of the optical lens 60 is in communication with the outside to ensure a relatively stable air pressure, thereby preventing a rapid flow of air from exerting force on adjacent components.

FIG. 16 is a cross-sectional view showing a seventh air escape channel 5070 of an optical lens 70 according to a seventh embodiment of the present application.

According to the seventh embodiment of the present application, the seventh air escape channel 5070 may be: an air escape hole arranged in the second lens barrel 204 in a direction perpendicular to the optical axis of the optical system consisting of the first lens and the second lens, or arranged in the second lens barrel 204 at an angle relative to the direction. It is worth mentioning that this seventh embodiment may be used in combination with the aforementioned second embodiment, e.g., the air escape channel may be arranged in both the first lens barrel 104 and the second lens barrel 204 in a direction perpendicular to the optical axis of the optical system consisting of the first lens and the second lens, or arranged in both the first lens barrel 104 and the second lens barrel 204 at an angle relative to the direction.

As shown in FIG. 16, for example, the seventh air escape channel 5070 may be horizontally arranged in the second lens barrel 204. One end 572 of the seventh air escape channel 5070 leading to the cavity 1200 is arranged with a relatively large opening to prevent adhesive from overflowing from the inside to block the air escape hole; the other end 574 of the seventh air escape channel 5070 leads to the outside, so that an internal space of the optical lens 70 is in communication with the outside to ensure a relatively stable air pressure, thereby preventing a rapid flow of air from exerting force on adjacent components.

Figure 17A:
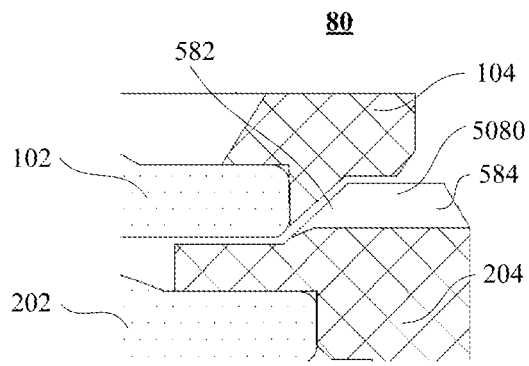
FIGS. 17A and 17B are cross-sectional views showing a eighth air escape channel of an optical lens according to the eighth embodiment of the present application.
Figure 17B:
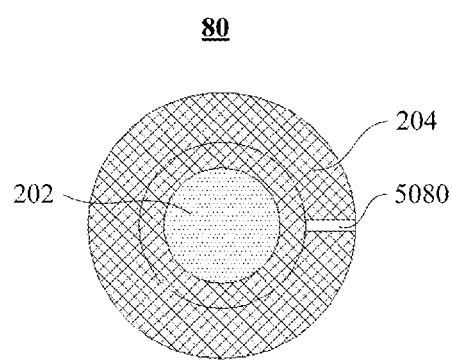

FIGS. 17A and 17B are cross-sectional views showing a eighth air escape channel 5080 of an optical lens 80 according to a eighth embodiment of the present application.

According to the eighth embodiment of the present application, the eighth air escape channel 5080 may be a groove arranged on the surface of the second lens barrel 204 facing the first lens barrel 104. It is worth mentioning that this eighth embodiment may be used in combination with the aforementioned fourth embodiment, e.g., the air escape channel may be both of the groove arranged on the surface of the first lens barrel 104 facing the second lens barrel 204 and the groove arranged on the surface of the second lens barrel 204 facing the first lens barrel 104.

As shown in FIGS. 17A and 17B, for example, the eighth air escape channel 5080 may be horizontally arranged in the second lens barrel 204, and is open toward the surface of the first lens barrel 104. One end 582 of the eighth air escape channel 5080 leading to the cavity 1200 is arranged with a relatively large opening to prevent adhesive from overflowing from the inside to block the air escape hole; the other end 584 of the eighth air escape channel 5080 leads to the outside, so that an internal space of the optical lens 80 is in communication with the outside to ensure a relatively stable air pressure, thereby preventing a rapid flow of air from exerting force on adjacent components.

Figure 18A:
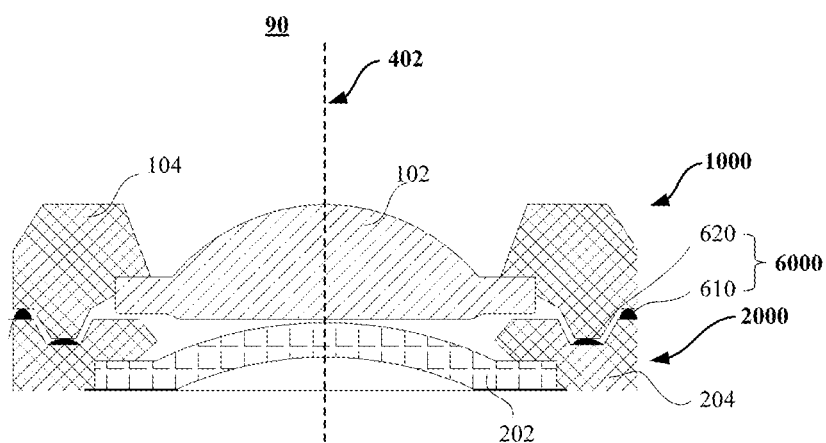
FIGS. 18A to 18C are cross-sectional views showing a ninth air escape channel of an optical lens according to the ninth embodiment of the present application.
Figures 18B, 18C:
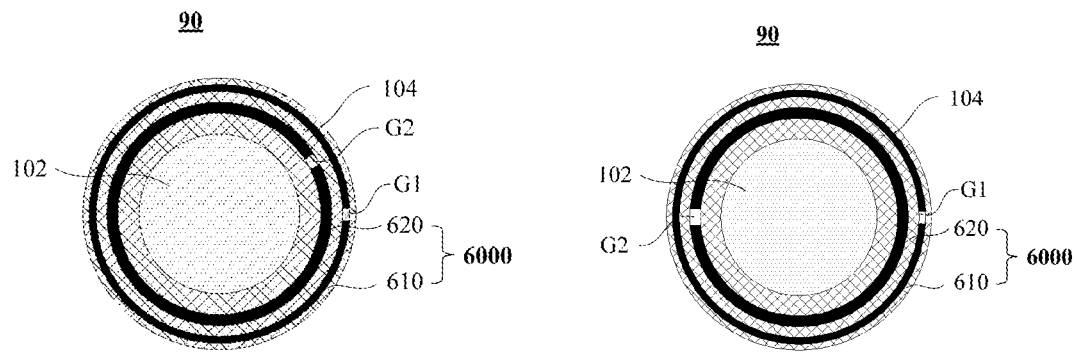

FIGS. 18A-18C are cross-sectional views showing a ninth air escape channel of an optical lens 90 according to a ninth embodiment of the present application. In addition, FIGS. 18A-18C also show the aforementioned adhesive 6000.

According to the ninth embodiment of the present application, the adhesive 6000 (including 610 and 620) is in a form of a C-shaped ring in a plane view, so that gaps G1 and G2 of the C-shaped ring form the ninth air escape channel.

In an alternative embodiment, the adhesive 6000 in a plane view may be in a form of a plurality of C-shaped rings spaced apart from each other in the radial direction.

As shown in FIG. 18A, the first sub-lens 1000 and the second sub-lens 2000 are connected by using the adhesive 6000 (for example, glue). As shown in FIG. 18B, when viewed from a top view, for example, the adhesive 6000 may be distributed in a ring shape, and the ring-shaped adhesive tape is arranged with gaps (for example, G1 and G2) to be used as air escape channels, e.g., the adhesive 6000 has a C-shaped distribution. If there are two or more times of adhesive dispensing, a gap should be remained as an air escape hole for each dispensing, as shown in FIG. 18B. For example, for two times of adhesive dispensing, the outer layer glue and the inner layer glue are cured separately, and for example, the outer layer glue may be cured by light and the inner layer glue may be cured by heat.

In an alternative embodiment, the gap of the C-shaped ring in the outermost layer may be sealed after assembly of the optical lens is completed, e.g., the optical lens further includes sealing material for sealing one end of the air escape channel leading to the outside. Generally, the air escape channel needs to be sealed when the baking is finished so as to prevent dust or other dirt from entering the optical lens from the air escape channel. In the case of dispensing adhesive twice or more, only the gap of adhesive in the outermost ring is required to be sealed.

In an alternative embodiment, as shown in FIG. 18C, the gaps of the multiple C-shaped rings may be spaced apart as far as possible in the circumferential direction. This embodiment is mainly applicable to the case that the number of adhesive dispensing times is two or more. By setting the distance between the gaps of the multiple annular adhesive tapes as far as possible, dust cannot easily enter the effective area of the lens from the two gaps, so that the final step of sealing the gap may be omitted.

In addition to arranging a gap on the adhesive as an air escape channel, an air escape groove may also be arranged along the surface of a connection point of the first sub-lens and the second sub-lens, and at least one recess is arranged at each of the two adjacent sides of each air escape groove for storing excessive glue overflowing from the side, thereby preventing the adhesive from overflowing to block the air escape groove. This will be described below with reference to FIGS. 19A-21B.

Figure 19A:
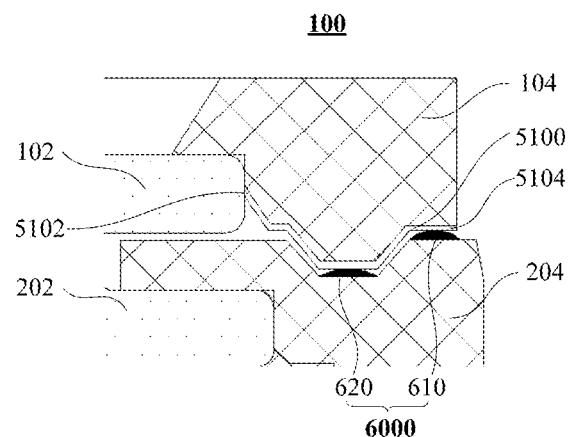
FIGS. 19A and 19B are cross-sectional views showing a tenth air escape channel of an optical lens according to the tenth embodiment of the present application.
Figure 19B:
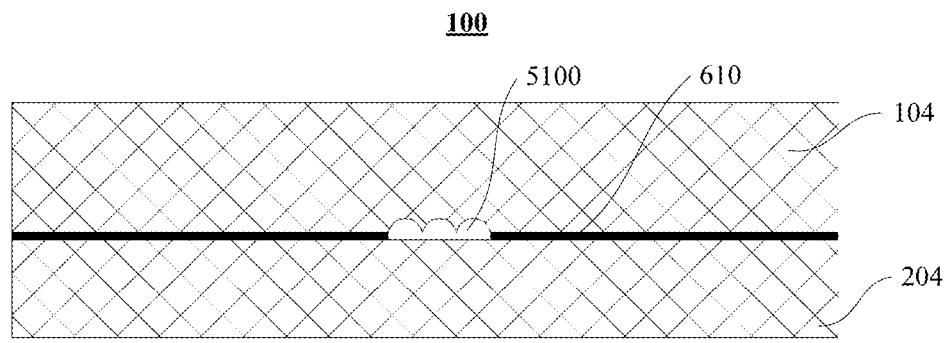

FIGS. 19A and 19B are cross-sectional views showing a tenth air escape channel of an optical lens 100 according to a tenth embodiment of the present application.

According to the tenth embodiment of the present application, the tenth air escape channel may further include an air escape groove 5100 being in communication with the gaps G1 and G2 of the C-shaped ring, and the air escape groove 5100 is arranged in the first lens barrel 104 along the contact part between the first sub-lens 1000 and the second sub-lens 2000. That is to say, the air escape groove 5100 is in communication with the gaps G1 and G2 of the adhesive 6000, so as to jointly serve as the tenth air escape channel.

As shown in FIGS. 19A and 19B, for example, the air escape groove 5100 may be arranged in the first lens barrel 104 in a shape of a broken line. One end 5102 of the air escape groove 5100 leading to the cavity 1200 is arranged with a relatively large opening to prevent adhesive from overflowing from the inside to block the air escape hole; the other end 5104 of the air escape groove 5100 leads to the outside, so that an internal space of the optical lens 100 is in communication with the outside to ensure a relatively stable air pressure, thereby preventing a rapid flow of air from exerting force on adjacent components.

Figure 20A:
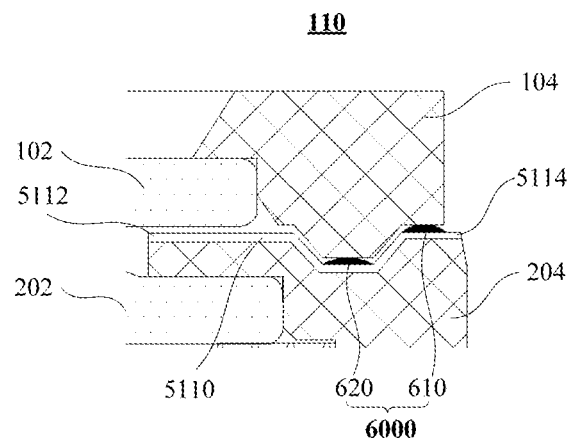
FIGS. 20A and 20B are cross-sectional views showing a eleventh air escape channel of an optical lens according to the eleventh embodiment of the present application.
Figure 20B:
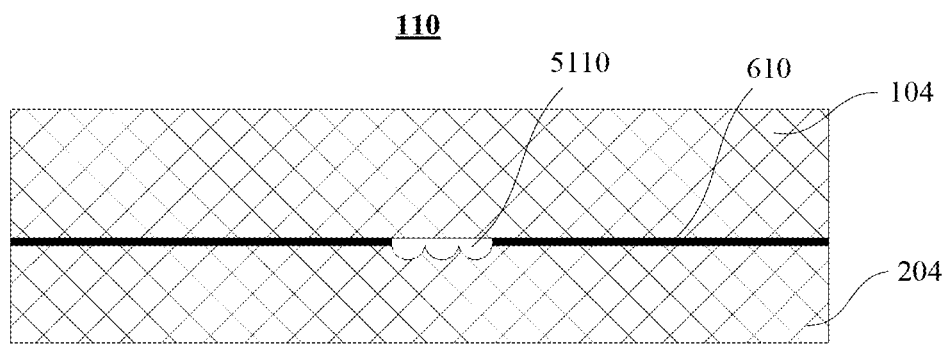

FIGS. 20A and 20B are cross-sectional views showing an eleventh air escape channel of an optical lens 110 according to an eleventh embodiment of the present application.

According to the eleventh embodiment of the present application, the eleventh air escape channel may further include an air escape groove 5110 being in communication with the gaps G1 and G2 of the C-shaped ring, and the air escape groove 5100 is arranged in the second lens barrel 204 along the contact part between the first sub-lens 1000 and the second sub-lens 2000. That is to say, the air escape groove 5100 is in communication with the gaps G1 and G2 of the adhesive 6000, so as to jointly serve as the eleventh air escape channel.

As shown in FIGS. 20A and 20B, for example, the air escape groove 5110 may be arranged in the second lens barrel 204 in a shape of a broken line. One end 5112 of the air escape groove 5110 leading to the cavity 1200 is arranged with a relatively large opening to prevent adhesive from overflowing from the inside to block the air escape hole; the other end 5114 of the air escape groove 5110 leads to the outside, so that an internal space of the optical lens 110 is in communication with the outside to ensure a relatively stable air pressure, thereby preventing a rapid flow of air from exerting force on adjacent components.

Figure 21A:
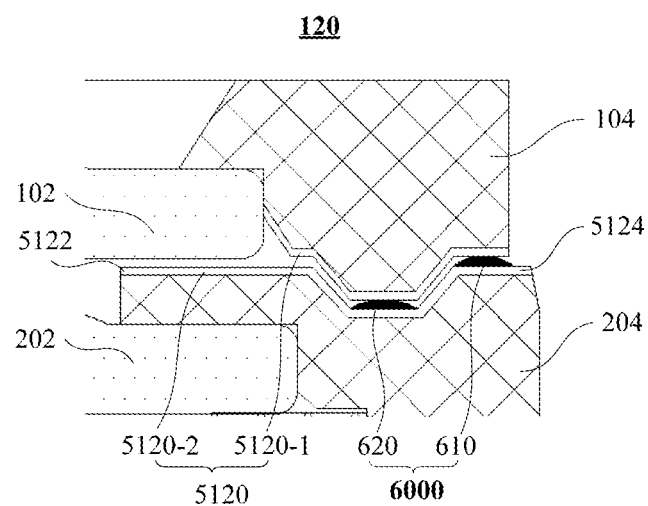
FIGS. 21A and 21B are cross-sectional views showing a twelfth air escape channel of an optical lens according to the twelfth embodiment of the present application.
Figure 21B:
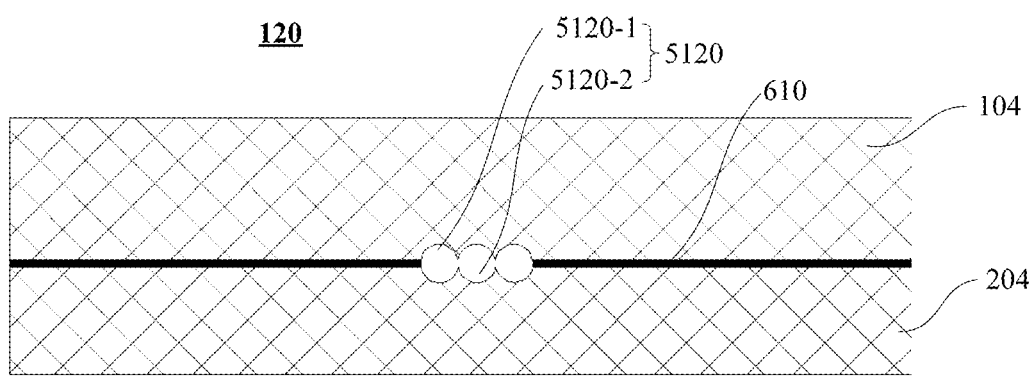

FIGS. 21A and 21B are cross-sectional views showing a twelfth air escape channel of an optical lens 120 according to a twelfth embodiment of the present application.

According to the twelfth embodiment of the present application, the twelfth air escape channel may further include an air escape groove 5120 being in communication with the gaps G1 and G2 of the C-shaped ring, and the air escape groove 5120 is arranged in both of the first lens barrel 104 and the second lens barrel 204 along the contact part between the first sub-lens 1000 and the second sub-lens 2000. That is to say, the air escape groove 5120 includes a first air escape groove 5120-1 arranged in the first lens barrel 104 and a second air escape groove 5120-2 arranged in the second lens barrel 204, and the first air escape groove 5120-1 and the second air escape groove 5120-2 are in communication with the gaps G1 and G2 of the adhesive 6000, so as to jointly serve as the twelfth air escape channel.

As shown in FIGS. 21A and 21B, taking the second air escape groove 5120-2 as an example, the second air escape groove 5120-2, for example, may be arranged in the second lens barrel 204 in a shape of a broken line. One end 5122 of the second air escape groove 5120-2 leading to the cavity 1200 is arranged with a relatively large opening to prevent adhesive from overflowing from the inside to block the air escape hole; the other end 5124 of the second air escape groove 5120-2 leads to the outside, so that an internal space of the optical lens 120 is in communication with the outside to ensure a relatively stable air pressure, thereby preventing a rapid flow of air from exerting force on adjacent components. The configuration of the first air escape groove 5120-1 is similar to the air escape groove 5100 described with reference to FIGS. 19A and 19B, and the description is not repeated herein.

It is worth mentioning that although the present application shows the configuration of the air escape channels in the first to twelfth embodiments, it should be understood that the air escape channels in the above embodiments may be used individually or in any combination as needed.

According to the present application, the optical lens is arranged with an air escape channel for the air between the upper and lower lens components to escape, thereby avoiding the influence of the pressure generated by the heat-expansion or cold-contraction of the air during baking on the multi-group lens, and reducing the baking variation of the lens module.

The above description is only the preferred embodiments of the application and the description of the applied technical principles. Those skilled in the art should understand that the scope of protection involved in this application is not limited to the technical solution formed by the specific combination of the above technical features, and should also cover other technical solutions formed by any combination of the above described technical features or equivalent features thereof without departing from the technical concept; for example, the technical solutions formed by mutually replacing the above-mentioned features for the technical features disclosed in this application (but not limited to them) with similar functions.

The invention claimed is:

1. A method for manufacturing an imageable optical device, the method comprising:
pre-positioning at least two lens components along an optical axis to make the at least two lens components able to form an image, wherein a first structural gap and a second structural gap are arranged at different positions between a same two adjacent lens components of the at least two lens components, the first structural gap and the second structural gap are parallel to each other and both extend horizontally, an isolation section is located between the first structural gap and the second structural gap so that the first structural gap and the second structural gap are connected through the isolation section at one end to have a same width, and the first structural gap is closer to the optical axis and a photosensitive assembly than the second structural gap;
adjusting relative positions of the pre-positioned at least two lens components by active alignment;
arranging a first adhesive in the first structural gap, and arranging a second adhesive in the second structural gap; and
sequentially curing the first adhesive and the second adhesive.

2. The method for manufacturing an imageable optical device according to claim 1, further comprising, before the pre-positioning of the at least two lens components along the optical axis:
shaping surfaces of the two adjacent lens components of the at least two lens components corresponding to the first structural gap to extend away from a direction of the optical axis and face outer openings of the at least two lens components.

3. The method for manufacturing an imageable optical device according to claim 1, further comprising, before the pre-positioning of the at least two lens components along the optical axis:
shaping surfaces of the two adjacent lens components corresponding to the first structural gap to fit each other; and
shaping surfaces of the two adjacent lens components corresponding to the second structural gap to fit each other.

4. The method for manufacturing an imageable optical device according to claim 3, further comprising, before the pre-positioning of the at least two lens components along the optical axis:
shaping the surfaces of the two adjacent lens components corresponding to the first structural gap and the second structural gap to be perpendicular to the optical axis.

5. The method for manufacturing an imageable optical device according to claim 4, further comprising, before the pre-positioning of the at least two lens components along the optical axis:
shaping the surfaces of any one of the two adjacent lens components corresponding to the first structural gap and the second structural gap to be on a same horizontal plane.

6. The method for manufacturing an imageable optical device according to claim 3, further comprising, before the pre-positioning of the at least two lens components along the optical axis:
shaping the surfaces of the two adjacent lens components corresponding to the first structural gap to be perpendicular to the optical axis, and
shaping the surfaces of the two adjacent lens components corresponding to the second structural gap to have an inclination segment inclined with respect to the optical axis.

7. The method for manufacturing an imageable optical device according to claim 1, further comprising, before the pre-positioning of the at least two lens components along the optical axis:
forming a connecting protrusion part on one of the two adjacent lens components; and
forming a connecting recess part that fits and receives the connecting protrusion part on another of the two adjacent lens components.

8. The method for manufacturing an imageable optical device according to claim 7, wherein the forming of the connecting protrusion part includes any one of:

forming the connecting protrusion part to have at least one shape of a trapezoidal, triangular, rectangular, semi-circular, and double-triangular shape in a cross section parallel to the optical axis;

forming the connecting protrusion part to have a continuous shape in a cross section perpendicular to the optical axis; or forming the connecting protrusion part to have a discrete shape in a cross section perpendicular to the optical axis.

9. The method for manufacturing an imageable optical device according to claim 1, wherein the pre-positioning of the at least two lens components along the optical axis includes:

bringing the at least two lens components close to each other along the optical axis so that the first structural gap and the second structural gap have the same width.

10. The method for manufacturing an imageable optical device according to claim 1, wherein the pre-positioning of the at least two lens components along the optical axis includes:

bringing the at least two lens components close to each other along the optical axis so that the first structural gap and the second structural gap have a width range of 30-100 μm.

11. The method for manufacturing an imageable optical device according to claim 1, wherein:

the first adhesive is a light curing adhesive or a photo-thermal curing adhesive;

the first structural gap has a light-receiving opening;

the second adhesive is a heat curing adhesive; and the curing includes:

irradiating the first adhesive with a light sensitive to the light curing adhesive or the photo-thermal curing adhesive; and heating the second adhesive.

12. An imageable optical device, comprising:

at least two lens components, each of the at least two lens components including at least one lens and being positioned sequentially along an optical axis direction, a first structural gap and a second structural gap being arranged at different positions between a same two adjacent lens components of the at least two lens components, and the first structural gap and the second structural gap being parallel to each other and both extending horizontally, a first adhesive arranged in the first structural gap; and a second adhesive arranged in the second structural gap, wherein arrangement positions and material of the first adhesive and the second adhesive are adapted to enable the first adhesive and the second adhesive to be cured successively at different times, and wherein an isolation section is located between the first structural gap and the second structural gap so that the first structural gap and the second structural gap are connected through the isolation section at one end to have a same width, and the first structural gap is closer to an optical axis of the imageable optical device and a photosensitive assembly than the second structural gap.

13. An optical lens, comprising:

a first sub-lens, including at least one first lens and a first lens barrel that accommodates the first lens, or comprising a single first lens;

a second sub-lens, including at least one second lens and a second lens barrel that accommodates the second lens; and an adhesive, bonding the first sub-lens and the second sub-lens together, the adhesive, the first sub-lens and the second sub-lens jointly forming a cavity, wherein part of at least one of the first lens, the first lens barrel, the second lens, the second lens barrel, and the adhesive forms an air escape channel, and one end of the air escape channel leads to the cavity, and another end of the air escape channel leads to outside, and wherein a first structural gap and a second structural gap are arranged at different positions between the first sub-lens and the second sub-lens, which are adjacent to each other, the first structural gap and the second structural gap are parallel to each other and both extend horizontally, the adhesive is arranged in the first structural gap and the second structural gap, an isolation section is located between the first structural gap and the second structural gap so that the first structural gap and the second structural gap are connected through the isolation section at one end to have a same width, and the first structural gap is closer to an optical axis of the optical lens and a photosensitive assembly than the second structural gap.

14. The optical lens according to claim 13, wherein the one end of the air escape channel leading to the cavity has an opening that is enlarged relative to a size of the air escape channel.

15. The optical lens according to claim 13, wherein the another end of the air escape channel leading to the outside has another opening that is enlarged relative to a size of the air escape channel.

16. The optical lens according to claim 15, wherein the another opening has an inclined inner surface.

17. The optical lens according to claim 13, wherein the air escape channel is any one of:

an air escape hole arranged in the first lens barrel in a direction parallel to an optical axis of an optical system comprising the first lens and the second lens, or arranged in the first lens barrel at an angle relative to the direction;

an air escape hole arranged in the first lens barrel and/or the second lens barrel in a direction perpendicular to an optical axis of an optical system comprising the first lens and the second lens, or arranged in the first lens barrel and/or the second lens barrel at an angle relative to the direction; or an air escape hole arranged in an ineffective area of the first lens in a direction parallel to an optical axis of an optical system comprising the first lens and the second lens, or arranged in the ineffective area of the first lens at an angle relative to the direction, wherein the first lens includes an effective area for transmitting light and the ineffective area located at a periphery of the effective area.

18. The optical lens according to claim 13, wherein the air escape channel is any one of:

a groove arranged at a surface of the first lens barrel facing the second lens barrel, and/or arranged at a surface of the second lens barrel facing the first lens barrel; or an air escape groove arranged on the first lens barrel and/or the first lens along a contact boundary between the first lens barrel and the first lens.

19. The optical lens according to claim 13, wherein the adhesive is in a form of a C-shaped ring in a plane view, so that the air escape channel is formed by a gap of the C-shaped ring.

20. The optical lens according to claim 19, wherein the adhesive is in a form of a plurality of C-shaped rings spaced apart from each other in a radial direction in a plane view.

\* \* \* \* \*